US012806561B2

(12) United States Patent
Thompson et al.

(10) Patent No.: US 12,806,561 B2
(45) Date of Patent: Nov. 24, 2026

(54) BETA-AMINO CARBOXYLATE (BAC) SOLVENTS FOR ENHANCED CO2 SEPARATIONS

(71) Applicant: BATTELLE MEMORIAL INSTITUTE, Columbus, OH (US)

(72) Inventors: Robert L. Thompson, Pittsburgh, PA (US); Jeffrey T. Culp, Wexford, PA (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 757 days.

(21) Appl. No.: 18/128,204

(22) Filed: Mar. 29, 2023

(65) Prior Publication Data

US 2023/0321591 A1 Oct. 12, 2023

Related U.S. Application Data

(60) Provisional application No. 63/325,146, filed on Mar. 29, 2022.

(51) Int. Cl.
*B01D 53/14* (2006.01)
*B01D 53/62* (2006.01)
(Continued)

(52) U.S. Cl.
CPC ..... *B01D 53/1493* (2013.01); *B01D 53/1425* (2013.01); *B01D 53/1475* (2013.01);
(Continued)

(58) Field of Classification Search
CPC ........ B01D 53/14; B01D 53/62; B01D 53/78; B01D 53/96
See application file for complete search history.

(56) References Cited

U.S. PATENT DOCUMENTS 8,568,512 B2 10/2013 Siegel et al.

FOREIGN PATENT DOCUMENTS

AT 400530 B 1/1996
DE 3612259 A1 5/1987
(Continued)

OTHER PUBLICATIONS

Miller, M. B. et al. Critical Assessment of CO2 Solubility in Volatile Solvents at 298.15 K, J. Chem. Eng. Data 2011, 56, 1565-1572.
(Continued)

*Primary Examiner* — Sharon Pregler
(74) *Attorney, Agent, or Firm* — Susanne A. Wilson; Frank Rosenberg

(57) ABSTRACT

Steric effects on amine sites beta to amide or ester functional groups are utilized to result in a family of $CO_2$ solvents with an unprecedented hybridization of chemisorption and physisorption properties. These versatile solvents provide very high $CO_2$ working capacities in applications typically involved with physical solvents such as Selexol, Genosorb, Fluor Solvent, Purisol, and Rectisol with the added benefit of operation near ambient conditions without the need for solvent chilling along with the potential for high pressure recovery of $CO_2$. The non-aqueous BAC solvents can also be tailored for low partial pressure $CO_2$ removal as required in such applications as biogas/landfill gas upgrading and $CO_2$ removal from industrial processes such as cement and steel manufacturing where they benefit from lower energy requirements for regeneration compared to tradition aqueous amine solution, regeneration under 1 bar $CO_2$ without steam stripping, reduced corrosion potential, reduced solvent loss, reduced environmental impact, higher volumetric $CO_2$ uptake compared to standard commercialized processes involving physical solvents, and operation at ambient pressure without the need for feed gas compression.

22 Claims, 12 Drawing Sheets

(51) Int. Cl.
*B01D 53/78* (2006.01)
*B01D 53/96* (2006.01)
*E21B 41/00* (2006.01)

(52) U.S. Cl.
CPC ............. *B01D 53/62* (2013.01); *B01D 53/78* (2013.01); *B01D 53/96* (2013.01); *E21B 41/0064* (2013.01); *B01D 2252/20426* (2013.01); *B01D 2257/504* (2013.01)

(56) References Cited

FOREIGN PATENT DOCUMENTS

| | | | | |
|---|---|---|---|---|
| DE | 3823665 | A1 | 1/1990 | |
| DE | 4208456 | A1 | 12/1994 | |
| DE | E4338003 | A1 | 5/1995 | |
| ES | 2299373 | A1 * | 5/2008 | ............. B01D 53/14 |
| KR | 20130129597 | A | 11/2013 | |
| TW | 201817491 | A | 5/2018 | |

OTHER PUBLICATIONS

Ochedi, F. O. et al., "Carbon dioxide capture using liquid absorption methods: a review", Environ. Chem. Lett., 19, 2021, 77-109.
Krishnan, A. et al., Ionic liquids, deep eutectic solvents and liquid polymers as green solvents in carbon capture technologies: a review, Environ. Chem. Lett., 18, 2020, 2031-2054.
Wanderley, R. R. et al. "From hybrid solvents to water-lean solvents—A critical and historical review", Sep. Purif. Tech., 260, 2021, 118193.
Heldebrant, D. J. et al., "Water-Lean Solvents for Post-Combustion CO2 Capture: Fundamentals, Uncertainties, Opportunities, and Outlook", Chem. Rev., 117, 2017, 9594-9624.
Burr, B. et al., "A Comparison of Physical Solvents for Acid Gas Removal", Hydrocarbon Processing, 88, 2009, 43-50.
Siefert, N. S. al., "Hydrophobic physical solvents for precombustion CO2 capture: Experiments, computational simulations, and techno-economic analysis", Int. J. Greenhouse Gas Control 2016, 49, 364-371.
Ma, Chunyan et al. "Techno-economic analysis and performance comparison of aqueous deep eutectic solvent and other physical absorbents for biogas upgrading"; Appl. Energy, 225, 2018, 437-447.
Yan, C. et al. "Photosynthetic CO2 uptake by microalgae for biogas upgrading and simultaneously biogas slurry decontamination by using of microalgae photobioreactor under various light wavelengths, light intensities, and photoperiods", Appl. Energy, 178, 2016, 9-18.
Bacsik, Z. et al. Selective separation of CO2 and CH4 for biogas upgrading on zeolite NaKA and SAPO-56, Appl. Energy, 162, 2016, 613-621.
Sun, Q. et al. "Selection of appropriate biogas upgrading technology—a review of biogas cleaning, upgrading and utilization", Renew. Sust. Energy Rev., 51, 2015, 521-532.
Luo, G. et al. "A new degassing membrane coupled upflow anaerobic sludge blanket (UASB) reactor to achieve in-situ biogas upgrading and recovery of dissolved CH4 from the anaerobic effluent", Appl. Energy, 132, 2014, 536-542.
Bauer, F. et al., "Biogas upgrading—Review of commercial technologies", SGC Rapport; 2013:270.
Patterson, T. et al., "An evaluation of the policy and techno economic factors affecting the potential for biogas upgrading for transport fuel use in the UK", Energy Policy, 39, 2011, 1806-1816.
Niesner, J. et al., "Biogas upgrading technologies: state of art review in European region", Chem. Eng. Trans., 35, 2013, 517-522.
Patterson, A. et al. "Biogas upgrading technologies—developments and innovations", IEA Bioenergy, 2009.
Gotz, M. et al., "Potential to optimize scrubbers for biogas cleaning Part 1—Physical scrubbers", Chem. Ing. Tech., 83, 2011, 858-866.
Nie, H. et al., "Comparison of water scrubbing and propylene carbonate absorption for biogas upgrading process", Energy Fuels, 27, 2013, 3239-3245.
Tock, L. et al., "Thermochemical production of liquid fuels from biomass: Thermo-economic modeling, process design and process integration analysis", Biomass and Bioenergy, 34, 2010, 1838-1854.
Awe, O. W. et al., "A Review of Biogas Utilisation, Purification and Upgrading Technologies: Review", Waste and Biomass Valorization, Springer, Van Godewijckstraat 30, 3311 GZ Dordrecht, Netherlands, 8, 2017, 267-283.
Yang, F. et al., "Carbon capture and biomass in industry: A techno economic analysis and comparison of negative emission options", Renewable and Sustainable Energy Reviews, 144, 2021, 111028-111052.
American Biogas Council; www.AmericanBiogasCouncil.org accessed Jun. 16, 2023.
Hills, T. et al., "Carbon Capture in the Cement Industry: Technologies, Progress, and Retrofitting", Environ. Sci. Technol., 50, 2016, 368-377.
Baker, R. W. et al., "CO2 Capture from Cement Plants and Steel Mills Using Membranes", Ind. Eng. Chem. Res., 57, 2018, 15963-15970.
Koech, P. K. et al., "Low viscosity alkanol guanidine and alkanol amidine liquids for CO2 capture", RSC Advances, 2013, 3, 566.
Machine Translation of Description of DE 3612259 A1.
Machine Translation of Description of DE 3823665 A1.
Machine Translation of Description of DE 4208456 A1.
Machine Translation of Description of DE 4338003 A1.
Machine Translation of Description of AT 400530 B.
Machine Translation of Description of TW 201817491 A.
Machine Translation of Description of KR 20130129597 A.

* cited by examiner

BETA-AMINO CARBOXYLATE (BAC) SOLVENTS FOR ENHANCED CO2 SEPARATIONS

RELATED APPLICATIONS

This application claims the priority benefit of U.S. Provisional Patent Application Ser. No. 63/325,146 filed 29 Mar. 2022 which is incorporated herein as if reproduced in full below.

Government Rights: This invention was created utilizing funding from the Department of Energy, RSS contract number 89243318CFE000003. The government has certain rights in the invention.

INTRODUCTION

Industrial $CO_2$ Capture

Cost effective $CO_2$ capture processes are in high demand due to environmental concerns related to $CO_2$ emissions, the need to remove $CO_2$ for upgrading fuel streams such as $CH_4$ and $H_2$, and to meet the demands for $CO_2$ utilization in enhanced oil recovery (EOR), etc. Continually looping solvent-based processes for $CO_2$ capture offer advantages in design, operation, and efficiency. Traditionally, $CO_2$ solvents have been categorized as either chemical solvents or physical solvents according to the strength of the interaction of $CO_2$ with the solvent. The standard chemical solvent for low partial pressure $CO_2$ capture is a solution of aqueous amine such as mono-ethanol amine. The high $CO_2$ binding energy of chemical solvents allow $CO_2$ capture at low partial pressures (<0.15 bar) of $CO_2$; however, aqueous amines present several problems which add costs to the capture process. For example, the high-water content adds to regeneration energy demands due to the high heat capacity of water and latent heat of evaporation. Aqueous amines are caustic solutions which present corrosion problems.

The high temperatures required for solvent regeneration result in significant evaporation of water and amine along with degradation of the amine. Amine solutions are typically regenerated with steam stripping and any amine and/or water evaporated during the solvent regeneration step must be removed from the recovered $CO_2$ prior to pipeline transport. All of these issues reduce the overall efficiency of the $CO_2$ capture system. Many of these issues can be reduced or eliminated by using nonaqueous solvents with low vapor pressure and moderate $CO_2$ binding energy.

Physical solvents are better suited for applications involving higher partial pressures (>8 bar) of $CO_2$ since elevated pressures are needed to increase $CO_2$ solubility due to the weaker $CO_2$ interaction with the solvent. The lower binding energy of $CO_2$ in physical solvents provides the advantage of a much lower energy demand for solvent regeneration since no heating or only mild heating is required; however, the lower $CO_2$ solubility in such solvents often creates a need for solvent chilling, additional compression of the feed gas, and/or larger solvent volumes which ultimately reduces the efficiency of the $CO_2$ capture process. The weaker $CO_2$ interaction with physical solvents can also lead to reduced $CO_2$ absorption selectivity with soluble gases such as methane. Currently employed common industrial physical solvents for $CO_2$ such as Selexol (polyethylene glycol), NMP (N-methyl pyrrolidinone), Fluor solvent (propylene carbonate), and methanol (Rectisol) all suffer from high water solubility and or volatility issues. High water uptake in the solvent reduces $CO_2$ capacity and increase pumping demands due to increased solvent mass. The dissolved water in the solvent leads to high humidity levels in the recovered $CO_2$ which must be rectified prior to pipeline transport. Volatile solvents must be operated chilled or condensed out of the recovered $CO_2$ stream and recycled. High water content in the solvent can lead to increased corrosion rates as well.

Many of the above-mentioned limitations on current chemical and physical solvents for $CO_2$ removal are significantly reduced by the versatile family of beta-amino carboxylate (BAC) solvent disclosed herein. BAC solvents are designed to operate as non-aqueous solvents with low viscosities and low vapor pressures. The molecular structures of the solvents can be tuned to give ideal $CO_2$ binding energies suited to the partial pressure range of $CO_2$ in the treated gas stream. For low partial pressure $CO_2$ capture applications such as biogas upgrading, land fill gas upgrading, and $CO_2$ recovery from cement and steel production, non-aqueous BAC solvents with strong $CO_2$ binding give high $CO_2$ working capacities at 25° C. without the need for gas compression. Solvent regeneration can be accomplished with mild regeneration temperatures of 60° C. using a pure $CO_2$ sweep gas at 1 bar with no need for steam stripping. Under these conditions, Selexol is completely ineffective and standard aqueous amines would require significantly higher regeneration temperatures and steam stripping of the solvent leading to a water saturated $CO_2$ stream requiring additional drying.

BACKGROUND

The following discussion is copied from the American Biogas Council website: https://americanbiogascouncil.org/biogas-market-snapshot/Sources: American Biogas Council, Biogas Opportunities Roadmap (USDA, EPA, DOE, 2014), EPA AgSTAR 2016, EPA LMOP 2017, Water Environment Federation "Enabling the Future" last updated Apr. 26, 2018: "Operational US Biogas Systems—The U.S. has over 2,200 sites producing biogas in all 50 states: 250 anaerobic digesters on farms, 1,269 water resource recovery facilities using an anaerobic digester (~860 currently use the biogas they produce), 66 stand-alone systems that digest food waste, and 652 landfill gas projects. For comparison, Europe has over 10,000 operating digesters and some communities are essentially fossil fuel free because of them.

Potential US Biogas Systems

The potential for growth of the U.S. biogas industry is huge. We count 14,958 new sites ripe for development today: 8,574 dairy, poultry, and swine farms and 3,878 water resource recovery facilities (including ~380 who are making biogas but not using it) could support new biogas systems, plus 2,036 food scrap-only systems and utilizing the gas at 415 landfills who are flaring their gas. If fully realized, according to an assessment conducted with the USDA, EPA and DOE as part of the Federal Biogas Opportunities Roadmap, plus data from ABC, these new biogas systems could produce 103 trillion kilowatt hours of electricity each year and reduce the emissions equivalent of removing 117 million passenger vehicles from the road. These new biogas systems would also catalyze an estimated $45 billion in capital deployment for construction activity which would result in approximately 374,000 short-term construction jobs to build the new systems and 25,000 permanent jobs to operate them. Indirect impacts along supply chains would be even greater."

Prior Art References include the following:

DE3612259A1, Solvent Elimination Method for Purifying Air from Solvent Dampers, 1987

DE3823665A1, Method and Device for Recovery of Organic Steams from Gases, 1988
DE4208456A1, Internal Combustion Engine Exhaust Gas Cleaning by Scrubbing Using Silicone Oil, 1992
DE4338003A1, Process for the Separation of Organic Components from Exhaust Air, 1993
AT400530B, Method for Purifying Oven Exhaust Gases, 1996
CN103561844A, Method and System for Methane Separation and Purification from Biogas, 2014
TW201817491A, Biogas Purification System Including a $CH_4$ and $CO_2$ Separation Unit, a Biogas
Separation Unit, and a $CO_2$ Separation Unit, 2016
KR20130129597A, Absorbent Additives for Absorption Process in Biogas Separation, 2013

1. M. B. Miller, D.-L. Chen, D. R. Luebke, J. K. Johnson, and R. M. Enick; Critical Assessment of $CO_2$ Solubility in Volatile Solvents at 298.15 K, *J. Chem. Eng. Data* 2011, 56, 1565-1572.
2. F. O. Ochedi, Y. Jianglong, Y. Hai, L. Yangxian, A. Hussain; Carbon dioxide capture using liquid absorption methods: a review, *Environ. Chem. Lett.,* 19, 2021, 77-109.
3. A. Krishnan, K. P. Gopinath, D.-V. N. Vo, R. Malolan, V. M. Nagarajan, J. Arun; Ionic liquids, deep eutectic solvents and liquid polymers as green solvents in carbon capture technologies: a review, *Environ. Chem. Lett.,* 18, 2020, 2031-2054.
4. R. R. Wanderley, D. D.D. Pinto, H. K. Knuutila; From hybrid solvents to water-lean solvents-A critical and historical review, *Sep. Purif. Tech.,* 260, 2021, 118193.
5. D. J. Heldebrant, P. K. Koech, V.-A. Glezakou, R. Rousseau, D. Malhotra, D. C. Cantu; Water-Lean Solvents for Post-Combustion $CO_2$ Capture: Fundamentals, Uncertainties, Opportunities, and Outlook, *Chem. Rev.,* 117, 2017, 9594-9624.
6. B Burr and L Lyddon; A Comparison of Physical Solvents for Acid Gas Removal, *Hydrocarbon Processing,* 88, 2009, 43-50.
7. N. S. Siefert, S. Agarwala, F. Shi, W. Shi, E. A. Roth, D. Hopkinson, V. A. Kusuma, R. L. Thompson, D. R. Luebke, H. B. Nulwala, Hydrophobic physical solvents for pre-combustion $CO_2$ capture: Experiments, computational simulations, and techno-economic analysis, Int. J. Greenhouse Gas Control 2016, 49, 364-371.
8. Chunyan Ma, Chang Liu, Xiaohua Lu, Xiaoyan Ji; Techno-economic analysis and performance comparison of aqueous deep eutectic solvent and other physical absorbents for biogas upgrading; *Appl. Energy,* 235, 2019, 1669-1670.
9. C. Yan, L. Zhu, Y. Wang; Photosynthetic $CO_2$ uptake by microalgae for biogas upgrading and simultaneously biogas slurry decontamination by using of microalgae photobioreactor under various light wavelengths, light intensities, and photoperiods, *Appl. Energy,* 178, 2016, 9-18.
10. Z. Bacsik, O. Cheung, P. Vasiliev, N. Hedin; Selective separation of $CO_2$ and $CH_4$ for biogas upgrading on zeolite NaKA and SAPO-56, *Appl. Energy,* 162, 2016, 613-621.
11. Q. Sun, H. Li, J. Yan, L. Liu, Z. Yu, X. Yu; Selection of appropriate biogas upgrading technology—a review of biogas cleaning, upgrading and utilization, *Renew. Sust. Energy Rev.,* 51, 2015, 521532.
12. G. Luo, W. Wang, I. Angelidaki; A new degassing membrane coupled upflow anaerobic sludge blanket (UASB) reactor to achieve in-situ biogas upgrading and recovery of dissolved $CH_4$ from the anaerobic effluent, *Appl. Energy,* 132, 2014, 536-542.
13. Bauer F, Hulteberg C, Persson T, Tamm D. Biogas upgrading-Review of commercial technologies. *SGC Rapport,* 2013. www.sgc.se
14. T. Patterson, S. Esteves, R. Dinsdale, A. Guwy; An evaluation of the policy and techno-economic factors affecting the potential for biogas upgrading for transport fuel use in the UK, *Energy Policy,* 39, 2011, 1806-1816.
15. J. Niesner, D. Jecha, P. Stehlík; Biogas upgrading technologies: state of art review in European region, *Chem. Eng. Trans.,* 35, 2013, 517-522.
16. A. Petersson, A. Wellinger; Biogas upgrading technologies-developments and innovations, IEA Bioenergy, 2009. https://www.ieabioenergy.com
17. M. Gotz, W. Koppel, R. Reimert, F. Graf; Potential to optimize scrubbers for biogas cleaning Part 1-Physical scrubbers, *Chem. Ing. Tech.,* 83, 2011, 858-866.
18. H. Nie, H. Jiang, D. Chong, Q. Wu, C. Xu, H. Zhou; Comparison of water scrubbing and propylene carbonate absorption for biogas upgrading process, *Energy Fuels,* 27, 2013, 3239-3245.
19. L. Tock, M. Gassner, F. Marechal; Thermochemical production of liquid fuels from biomass: Thermo-economic modeling, process design and process integration analysis, *Biomass and Bioenergy,* 34, 2010, 1838-1854.
20. O. W. Awe, Y. Zhao, A. Nzihou, D. P. Minh, N. Lyczko; A Review of Biogas Utilisation, Purification and Upgrading Technologies: Review. *Waste and Biomass Valorization,* Springer, Van Godewijckstraat 30, 3311 GZ Dordrecht, Netherlands, 8, 2017, 267-283.
21. F. Yang, J. C. Meerman, A. P. C. Faaij; Carbon capture and biomass in industry: A techno-economic analysis and comparison of negative emission options, *Renewable and Sustainable Energy Reviews,* 144, 2021, 111028-111052.
22. American Biogas Council; www.AmericanBiogasCouncil.org
23. T. Hills, D. Leeson, N. Florin, P. Fennell; Carbon Capture in the Cement Industry: Technologies, Progress, and Retrofitting, *Environ. Sci. Technol.,* 50, 2016, 368-377.
24. R. W. Baker, B. Freeman, J. Kniep, Y. I. Huang, T. C. Merkel; $CO_2$ Capture from Cement Plants and Steel Mills Using Membranes, *Ind. Eng. Chem. Res.,* 57, 2018, 15963-15970.
25. P. K. Koech, J. Zhang, I. V. Kutnyakov, L. Cosimbescu, S.-J. Lee, M. E. Bowden, T. D. Smurthwaite, D. J. Heldebrant, Low viscosity alkanol guanidine and alkanol amidine liquids for $CO_2$ capture, *RSC Advances,* 2013, 3, 566.

SUMMARY OF THE INVENTION

The invention comprises a family of unique hybrid $CO_2$ solvents which contain both chemisorptive and physisorptive functional groups within the solvent molecule. The modular molecular structure of the solvents is purposely designed to modify the $CO_2$ heat of absorption to obtain $CO_2$ uptake over a wide pressure/temperature range (10-40° C./0.2-25bar). Modifying the solvent molecular structure to provide stronger $CO_2$ binding energies leads to significant enhancement in $CO_2$ solubility over common commercial physical solvents such as Selexol at low partials pressures (0.2-3 bar). The non-aqueous BAC solvents also provide a particular enhancement in ease of regeneration over common commercial chemical $CO_2$ solvents such as aqueous amines. By modifying the steric constraints near the amine sight to give a weaker $CO_2$ binding energy, the solvents become better suited for high partial pressure $CO_2$ capture. The inclusion of carboxylate functional groups, particularly ester groups, on the molecule also adds a significant boost to $CO_2$ physical solubility since the ester function group is known to be one of the most effective functional groups for increasing $CO_2$ affinity in a solvent.

The critical feature of the molecular structures of the solvents disclosed herein provides an alkyl-amide or alkyl-ester (known generally as an alkyl carboxylate) containing an alkylamine functional group located on the second carbon from the carbonyl carbon (commonly referred to as the beta "β" carbon). The ester or amide functional group in combination with an optimal degree of steric crowding around the amine nitrogen are tailored to modify the strength of $CO_2$ binding in the solvent. These non-aqueous solvents are prepared to contain either one (mono-aminocarboxylate) or two (bis-aminocarboxylate) functional groups per molecule. The solvents have been shown or projected to possess very high $CO_2$ solubilities and high $CO_2/H_2$, $CO_2/N_2$ and $CO_2/CH_4$ as well as good $CO_2/H_2O$ absorption selectivities. As such, the solvents are well-suited for absorption of $CO_2$ over a wide range of partial pressures from 0.25 to 25 bar and can be regenerated at 1-20 bar with a mild temperature ramp of 25-50° C. above the absorption temperature. Temperature ranges for absorption are solvent dependent and can be tailored to range from 10° C. to 45° C. (20-35° C. preferred). Regeneration temperatures are typically in the range of 35-80° C. (55-70° C. preferred). Many of the solvents can be operated at or above ambient temperature without the need for solvent chilling and regenerated using low grade waste heat. Working capacities for $CO_2$ in the disclosed solvents are higher than standard commercial solvents even when operated at absorption temperatures 10-15° C. warmer than the standard solvents. The disclosed solvents also have the advantage of low viscosity, low vapor pressure, low environmental impact, and low-cost synthesis from commodity reagents.

In a first aspect a method of separating or removing $CO_2$ from a $CO_2$-containing fluid, comprising: providing a beta-amino carboxylate composition comprising at least 5 wt % of a beta-amino carboxylate or mixture of beta-amino carboxylates; combining the $CO_2$-containing fluid and the beta-amino carboxylate or mixture of beta-amino carboxylates at a first temperature and pressure to form a reaction product of $CO_2$ and the beta-amino carboxylate or mixture of beta-amino carboxylates; and exposing the reaction product of $CO_2$ and the beta-amino carboxylate or mixture of beta-amino carboxylates to a second temperature and pressure to release the $CO_2$ from the reaction product.

In a second aspect, the invention provides a method of separating or removing $CO_2$ from a $CO_2$-containing fluid, comprising: providing a beta-amino carboxylate composition comprising a beta-amino carboxylate or mixture of beta-amino carboxylates; combining the $CO_2$-containing fluid and the beta-amino carboxylate or mixture of beta-amino carboxylates at a first temperature and pressure to form a reaction product of $CO_2$ and the beta-amino carboxylate or mixture of beta-amino carboxylates; wherein the $CO_2$-containing fluid comprises at least 10 mol % $H_2O$; wherein the beta-amino carboxylate composition absorbs a higher percentage (or at least twice as high a percentage, or at least 5 times as high) of the $CO_2$ than $H_2O$ from the $CO_2$-containing fluid; and exposing the reaction product of $CO_2$ and the beta-amino carboxylate or mixture of beta-amino carboxylates to a second temperature and pressure to release the $CO_2$ from the reaction product.

In the present invention, a "beta-amino carboxylate" is defined as a compound having an amino group and beta-carboxyl group, where the beta carboxyl group is part of an ester or amide moiety. The reaction product can be the product of a chemical reaction, for example to form a carbamic acid or carbamate. Alternatively, the reaction product can be a complex with $CO_2$ physisorbed to the beta-amino carboxylate.

In another aspect, the invention provides a beta-amino carboxylate composition comprising one or any combination of the compounds described herein; and comprising at least 5 wt % $CO_2$ or at least 5 wt % of the reaction product of $CO_2$ and one or any combination of the compounds described herein. In a further aspect, the invention provides a $CO_2$ separation system comprising any of the compositions described herein.

In any of its aspects, the invention can be further characterized by one or any combination of the following: wherein the beta-amino carboxylate composition comprises less than 5% or less than 3% or less than 1% water by weight; wherein the beta-amino carboxylate composition comprises at least 50 wt % or at least 75 wt % or at least 90 wt % of a beta-amino carboxylate or mixture of beta-amino carboxylates; wherein the $CO_2$-containing fluid is a $CO_2$-containing fluid mixture comprising $CO_2$ and at least one other gaseous species, and wherein the step of separating or removing $CO_2$ comprises separating $CO_2$ from the at least one other gaseous species in the $CO_2$-containing fluid mixture; comprising pressure swing adsorption wherein the second pressure is less than the first pressure; comprising temperature swing adsorption wherein the second temperature is greater than the first temperature; further comprising a step of storing the released $CO_2$ in an underground cavern; wherein the released $CO_2$ could be used as a displacement gas in enhanced oil recovery systems; wherein the beta-amino carboxylate or mixture of beta-amino carboxylates comprises one or more of the compounds described in this specification; wherein the beta-amino carboxylate comprises one of the compounds described herein; wherein the beta-amino carboxylate composition comprises less than 5% or less than 3% or less than 1% water by weight; wherein the beta-amino carboxylate composition comprises less than 5% or less than 3% or less than 1% added water by volume ("added water" means water that is present in the BA composition prior to the combining step); wherein the beta-amino carboxylate composition comprises at least 50 wt % or at least 75 wt % or at least 90 wt % or at least 99 wt % of a beta-amino carboxylate or mixture of beta-amino carboxylates; wherein the beta-amino carboxylate composition comprises at least 10 wt % of a non-aqueous solvent; comprising a plurality of cycles of temperature swing absorption; comprising a plurality of cycles of pressure swing absorption; wherein the $CO_2$ containing fluid comprises at least 1 mol % $CO_2$ or at least 2 mol % $CO_2$ or at least 5, or at least 10, or at least 20, or at least 50 mol % $CO_2$; wherein the $CO_2$ containing fluid comprises at least 5 mol % $H_2O$, or at least 10 mol % $H_2O$, and a $CO_2/H_2O$ in a ratio of from 0.01 to 5, and wherein, in a single cycle, more $CO_2$ is adsorbed than $H_2O$; and/or wherein $CO_2$ is preferentially absorbed relative to $H_2O$; and/or wherein at least twice as much $CO_2$ than $H_2O$ is adsorbed (in the present invention, the terms "adsorbed" and adsorbed" may be used interchangeably and refer to $CO_2$ removed from the $CO_2$ containing fluid into the BA-containing composition); wherein the $CO_2$ containing fluid comprises 10 mol % $H_2O$ or less, or 5 mol % $H_2O$ or less, or 1 mol % $H_2O$ or less, and a $CO_2/H_2O$ in a ratio greater than 0.5, and wherein, in a single cycle, more $CO_2$ is adsorbed than $H_2O$, and/or wherein $CO_2$ is preferentially absorbed relative to $H_2O$; and/or wherein at least twice as much $CO_2$ than $H_2O$ is adsorbed; wherein the method is conducted in a temperature range of 0 to 50° C.; wherein the $CO_2$ containing fluid comprises 5 to 50 mol % $CO_2$.

In a further aspect, the invention provides beta-amino carboxylate composition comprising at least 5 wt % of one or more of the compounds described in the specification; and comprising at least 5 wt % $CO_2$ or at least 5 wt % of the reaction product of $CO_2$ and one or more of the compounds described in the specification. The invention also includes a beta-amino carboxylate composition comprising at least 2 wt % of one or more of the compounds described in the specification; and comprising at least 1 wt % $CO_2$ or at least 2 wt % of the reaction product of $CO_2$ and one or more of the compounds described in the specification; and further comprising at least 10 wt % (or at least 25 wt % or at least 50 wt %) of a non-aqueous solvent.

Some preferred non-aqueous solvents include commercial polyethylene glycol solvents such as Selexol®, or hydrophobic solvents such as tributyl phosphate, diethyl adipate, diisobutyl adipate, and diethyl sebacate. Appropriate solvents to use as blends with BAC would exhibit properties of low viscosity, moderate to high $CO_2$ solubility, low $CH_4$ solubility, and high boiling point. Hydrophobic solvents would be preferred in operations involving $CO_2$ removal from high humidity gas streams. Thus, the non-aqueous solvents preferably have a lower neat (pure) viscosity than the $CO_2$ loaded phase of the BAC solvent and a boiling point greater than 200° C. at standard conditions of 20 C and 1 atm.

The data presented herein shows properties of the invention. The invention may be further characterized by having the one or any combination of the properties (or within ±30% or ±20% or ±10% or ±5%) of one or any combination of the properties described herein.

For precombustion applications, BAC solvents have been developed with enhanced $CO_2$ binding and higher heats of $CO_2$ absorption over Selexol. The physical properties of BAC solvents allow for similar volumes of captured $CO_2$ at higher temperatures than used in the Selexol process and thus has the potential to reduce the cost of solvent chilling. In addition, the higher heat of $CO_2$ absorption provides a possible route for thermal regeneration of the solvent at elevated $CO_2$ pressures near or at the capture pressure. If employed, the higher $CO_2$ recovery pressure could lead to a significant reduction in compression cost of the recovered $CO_2$ prior to pipeline injection.

The highly tailorable solvents disclosed here satisfy the demand for low-cost $CO_2$ solvents with intermediate $CO_2$ binding energies for enhanced $CO_2$ recovery spanning a wide range of industrial and biogenic processes involving a broad band of $CO_2$ partial pressures such as biogas upgrading, landfill gas upgrading, and $CO_2$ capture in cement production, steel manufacturing, ammonia production, and hydrogen production.

Examples of applications of the invention include: precombustion $CO_2$ separation and capture at IGCC-CCS; $CO_2$ removal during generation of $H_2$ from reformed natural gas or from syngas; adjust $CO/H_2$ ratio for coal & biomass to liquids; remove $CO_2$ from syngas for coal & biomass to ammonia/fertilizer; natural gas sweetening; biogas upgrading; landfill gas upgrading; $CO_2$ capture during cement manufacturing, steel manufacturing, and petroleum refining. The BAC solvents can be used in continually looping solvent systems for $CO_2$ removal in the treatment of product gas streams such as $CH_4$ or $H_2$ or alternatively in the capture of $CO_2$ from exhaust/biproduct streams in industrial processes, and the invention includes these systems. The solvents can be employed in any process wherein the control of $CO_2$ concentrations is achieved by contact of the gas stream to be treated with a solvent and where the $CO_2$ capture step is done near ambient temperatures (e.g., 40 C or less). Thus, the gas stream to be treated could be exposed to the BAC solvent percolating through a packed column, or as an aspirated solvent, or bubbled through the solvent, or to a solvent in contact with or part of a gas separation membrane.

Advantages of BAC solvents over existing approaches include either higher pressure $CO_2$ removal processes such as precombustion $CO_2$ capture or $H_2$ production and low $CO_2$ concentration removal processes such as biogas/landfill gas upgrading and $CO_2$ capture during cement manufacturing, etc. For precombustion, BAC solvents provide higher $CO_2$ uptake at warmer temperatures than commercial physical solvents and reduce the need for solvent chilling. BAC solvents have higher heats of $CO_2$ absorption and provide a more efficient route to high pressure recovery of $CO_2$ compared to commercial physical solvents. BAC solvents show lower water solubility compared to Selexol and have significantly lower corrosion rates than water.

For Biogas upgrading: BAC solvents: absorb significantly more $CO_2$ than Selexol or water; do not require compression of the biogas to be effective; have $CO_2$ working capacities operating at ambient pressure which are 3-5× that of Selexol and 20× that of water operating at system pressures of 6-8 bar; and can achieve reduced system size/capital costs. Ester-based BAC solvents environmentally decompose into benign amino acids. BAC solvents can be synthesized from common reagents and tuned for desired physical properties. BAC solvents have $CO_2$:$CH_4$ and $CO_2$:$H_2O$ absorption selectivities several times higher than Selexol which reduces methane losses. BAC solvents are less susceptible to algae and bacterial growth than water.

DETAILED DESCRIPTION OF THE INVENTION

Figure 1:
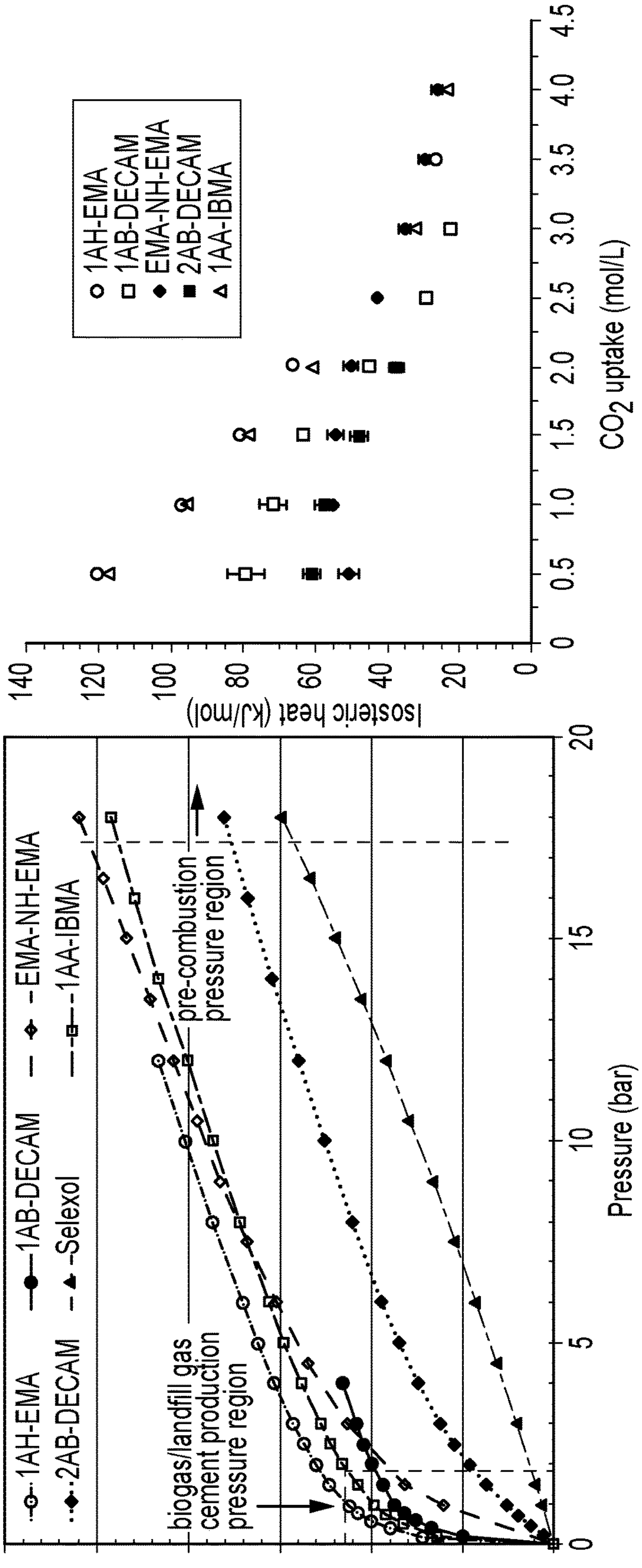
FIG. 1. Comparing $CO_2$ absorption isotherms at 25° C. (left) and isosteric heats of $CO_2$ absorption (right) for different BAC solvents to highlight the influence of structure on $CO_2$ uptake in the low-pressure and high-pressure regions. Selexol is included as an industrial benchmark. The optimal operational temperature range for a solvent is determined by viscosity, vapor pressure, and $CO_2$ solubility. The BAC solvents EMA-NH-EMA and 2AB-DECAM are more suitable for $CO_2$ capture at high pressures with warm regeneration. The solvents 1AH-EMA, 1AA-IBMA, and 1AB-DECAM are better suited for capture at lower partial pressures of $CO_2$, e.g. biogas upgrading.

The current invention provides $CO_2$ solubility in non-aqueous solvents by designing the molecular structure of the solvent to include two functional groups having favorable interactions with $CO_2$. The first functional group incorporated is the carboxylate group. The carboxylate group, in particular the ester functional group, is among the best for $CO_2$ physical solvents.[1] This functional group will enhance the $CO_2$ solubility in the higher-pressure region of the isotherm. The second functional group built into the solvent molecules is the amine functional group. Amines are known to react with $CO_2$ to form carbamic acids. In aqueous systems with excess amine, the reaction often proceeds to the formation of an ammonium carbamate by deprotonation of the carbamic acid. Additional hydrolysis by water can result in the formation of ammonium bicarbonate/carbonates. The regeneration of $CO_2$ is more energy intensive for bicarbonate/carbonates than it is for carbamic acids so our goal in the design of strong physical solvents for $CO_2$ is to limit bicarbonate/carbonates formation and thus reduce the energy required for regeneration while maintaining a strong $CO_2$ affinity.

Scheme 1. General structures of beta-amino carboxylate (BAC) solvents. The alkyl constituents provide high boiling points, low viscositites, and controlled hydrophilicity while providing high $CO_2$ solubility. Molecular weights for the solvents range from 180 to 400 g/mol, densities at 25° C. from 0.85-1.1 kg/L, viscosities at 25° C. from 2-32 cP and boiling points are >200° C.

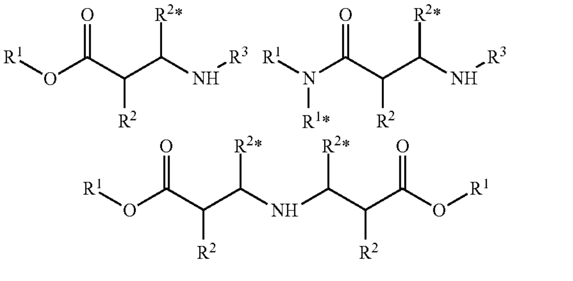

-continued

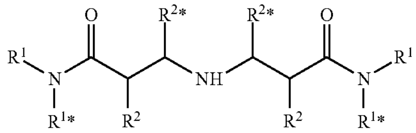

$R^1$ = alkyl ($C1$-$C_4$) branched, non-branched
$R^2$ = H, $CH_3$
$R^3$ = alkyl ($C_1$-$C_8$) branched, non-branched, or cyclic
* indicates tha groups can be the same or different

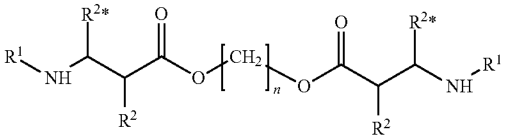

$R^1$ = alkyl ($C_1$-$C_8$) branched, non-branched, or cyclic
$R^1$ = H, $CH_3$
n = 3 to 5 (branched, non-branched)
* indicates that groups can be the same or different The amine solvents are tailored to maximize $CO_2$ uptake while minimizing the energy required for solvent regeneration in three ways. The first is to use the solvents as neat solvents or nonaqueous mixtures. Removing water from the $CO_2$ capture solvent system (that is, to use non-aqueous solvents) increases the overall efficiency of the process. Water promotes corrosion, has a high heat capacity, low boiling point, and latent heat of evaporation which combine to create a large energy penalty in the process. Water also has a very low $CO_2$ solubility. As such, dilution of the $CO_2$ active solvent with water will only reduce the overall volumetric $CO_2$ solubility. Increased water content in the solvent is "dead weight" and may also increase solvent viscosity. Both of these lead to increased pumping costs. Furthermore, the recovered $CO_2$ will have a high moisture content which will need to be remediated prior to pipeline injection. The less water in the solvent, the better. The second strategy is to locate the amine functional group beta to the carboxylate group. The electronic withdrawing effects of a functional group beta to the amine location tends to reduce the basicity and hence reactivity of the amine group. The stronger the electronic withdrawing effect, the less basic and $CO_2$-reactive the amine. The third approach is to sterically hinder the amine site to limit the strength of the interaction of $CO_2$ with the amino nitrogen. The more sterically crowded the amine site, the less favorable the $CO_2$ interaction is with the amine. The "hindered amine" and water lean techniques have been investigated by other researchers as a way to increase $CO_2$ capture efficiency, however, those studies were often hindered by one or more undesirable attributes.[2-5] For example, some studies include complex molecules which will be costly to scale up. Other studies on solvents involving branched alky amines suffer from costly complex molecules or involve highly volatile low molecular weight amines. Conversely, high molecular weight alkyl amine solvents are not favorable since high mole fractions of hydrocarbon in their structures have a negative effect on $CO_2$ solubility due to the weak interaction of $CO_2$ with methyl ($—CH_3$) or methylene ($—CH_2—$) units. Non-aqueous or water lean amine solvents often show significant increases in viscosity upon reaction with absorbed $CO_2$.

The molecular weights of the solvents are designed to provide a balance for low vapor pressure, low viscosity, and high $CO_2$ capacity. Physical properties along with the solvent hydrophilicity are tailored through the size and shape of the alkyl moieties. Additional alkyl hydrocarbon groups increase molecular weights and lower the vapor pressure while also reducing water affinity. These are positive effects for $CO_2$ physical solvents. Addition of too many hydrocarbon units, however, will increase the viscosity and lower the volumetric $CO_2$ solubility since the interaction of $CO_2$ with hydrocarbons is much weaker than the interaction of $CO_2$ with carboxylate groups and amines. Increased hydrocarbon mole fraction in the solvent may also increase the $CH_4$ solubility of the solvent which is undesirable for applications involving $CO_2$ removal from methane streams. An optimal range of hydrocarbons has been determined in which the overall molecular weight of the beta-amino carboxylate is in the range of 180-400 g/mol, with solvent densities in the range of 0.85-1.1 kg/L, viscosities at 25° C. from 2-32 cP and boiling points of at least 200° C. In some embodiments, the solvent has a molecular weight (or in the case of mixtures, a weight average molecular weight) of 350 or less or 300 Daltons or less, or in the range of 150 to 400 or 200 to 300 Daltons. BAC solvents will typically contain C1-C6 amino, amido, or ester groups. The alkyl groups can be linear, branched, or cyclic depending on the desired property of the solvent.

The syntheses of the solvents can be accomplished using established organic reactions as outlined in Scheme 2. The first step in the reaction sequence is the formation of the amide or ester derivative of acrylic acid, methacrylic acid, or crotonic acid. Many ester derivatives of acrylic acid, methacrylic acid, or crotonic acid are commercially available with the methyl, ethyl, and isobutyl esters very common and inexpensive. As such, the use of acrylic acid, methacrylic acid, or crotonic acid derivatives as a route to sterically hindered amines is a potentially more cost-effective route than preparing sterically hindered alkyl amines. Amide versions of the BAC compounds will typically require the reaction of an appropriate alkyl amine with the respective acid chloride. The next step is to react the amido or ester derivative of acrylic acid, methacrylic acid, or crotonic acid with an appropriate alkyl amine using a catalyzed Michael addition where the amine will add to the terminal alkene of the acrylate, methacrylate, or crotonate. Typical reaction times are one to a few days at temperatures ranging from 60-100° C., with lighter amines typically done in sealed reactors to minimize evaporative losses. Several catalysts which are effective for the Michael addition are known and include silica, alumina, and rare earth salts. The Michael addition can be done using a 1:1 ratio of amine to acrylate, methacrylate, or crotonate, a 2:1 ratio of amine to di-acrylate, di-methacrylate, or di-crotonate, or in a 1:2 ratio of ammonia to acrylate, methacrylate, or crotonate. The reactions are often done without the need for solvent. Many beta-amino carboxylates have been prepared and characterized in the course of this work. One skilled in the art would realize that mixed reactions are also possible for the 2:1 and 1:2 reactions in which two or more different amines could be used, or two or more different acrylate, methacrylate, or crotonate compounds could be used to give products with two or more functional groups in the final product. This might be valuable as a route to further refine physical properties of the solvents and $CO_2$ solubilities. Physical mixtures of pure BAC solvents could also be prepared, or mixtures of BAC solvents with other organic solvents, or mixtures of BAC solvents with water, or mixtures of BAC solvents with water and other organic solvent, etc. in a nearly limitless number of ways as well. The Examples focus on the preparation and characterization as pure solvents, or in some mixtures with organic solvents including Selexol, diethyl sebacate, and tributyl phosphate, but anyone skilled in the art could easily expand the applications of these solvents through a variety of mixtures.

Scheme 2. Typical Michael addition reactions to prepare beta-amino carboxylate (BAC) solvents.

β-amino esters

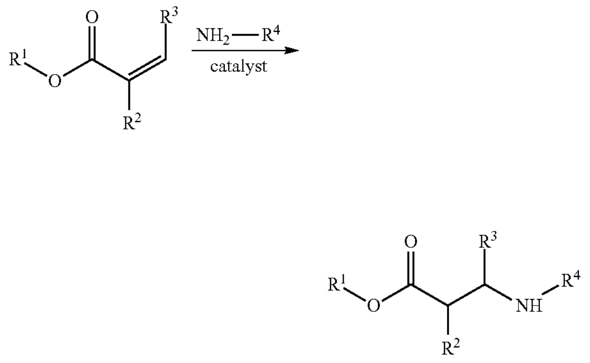

$R^1$ = alkyl
$R^2$ ($CH_3$, H)
$R^3$ ($CH_3$, H)
$R^4$ alkyl

β-amino amides

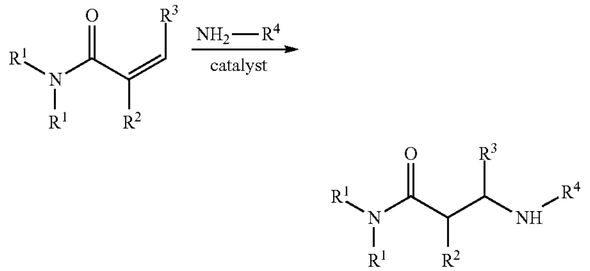

$R^1$ = alkyl
$R^2$ ($CH_3$, H)
$R^3$ ($CH_3$, H)
$R^4$ alkyl

β,β′-ammonia di-ester

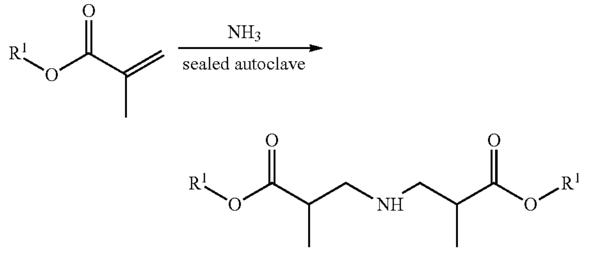

$R^1$ alkyl bis-[β-amino esters)

-continued

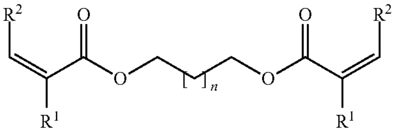

$R^1$ ($CH_3$, H)
$R^2$ ($CH_3$, H)
$R^3$ alkyl
n = 1-4

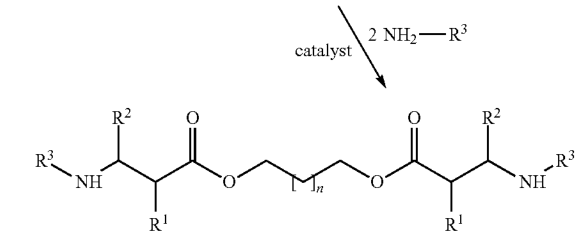

Scheme 3. Structures of selected BAC solvents. Solvents on the left ideally suited for applications involving partial pressures of $CO_2$ near 1 bar or below, whereas the solvents on the right are better suited for applications involving higher pressures of $CO_2$ in excess of 10 bar.

low $P_{CO2}$ solvents

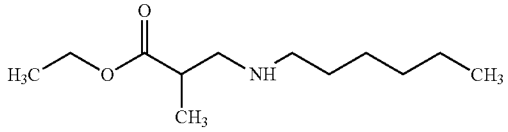

1AH-EMA

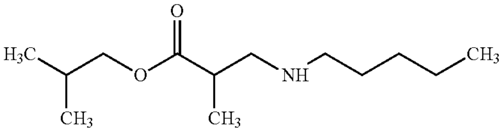

1AA-IBMA

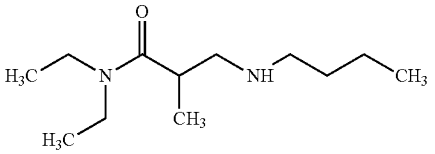

1AB-DECAM high $P_{CO2}$ solvents

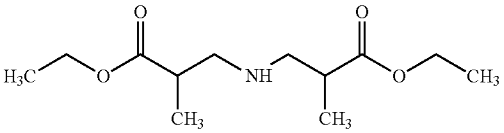

EMA-NH-EMA

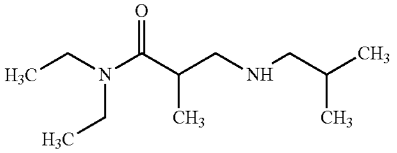

IBA-DECAM

-continued
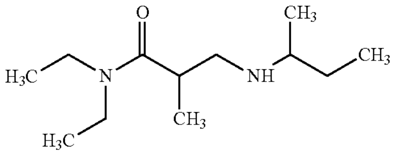
2AB-DECAM
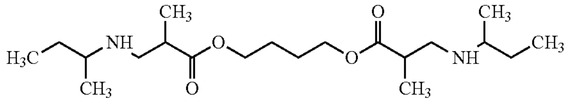
2AB-BDMA-2AB
Structures of inventive BAC solvents include (but are not limited to) the following:
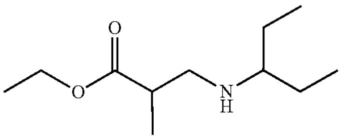
3AP-EMA
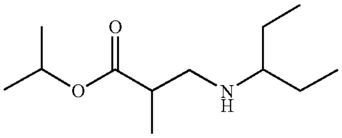
3AP-IPMA
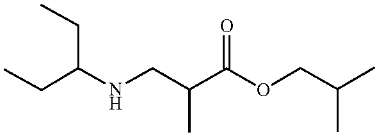
3AP-IBMA
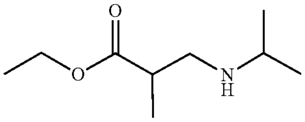
IPA-EMA
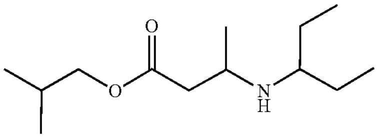
3AP-IBC
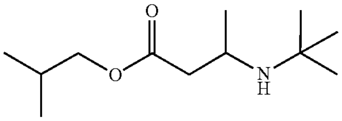
TBA-IBC
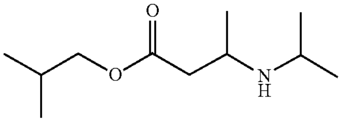
IPA-IBC
-continued
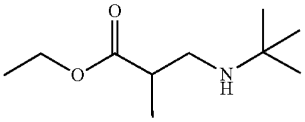
TBA-EMA
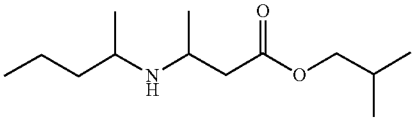
2AP-IBC
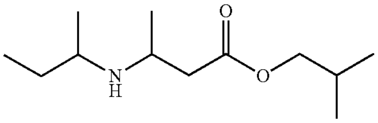
2AB-IBC
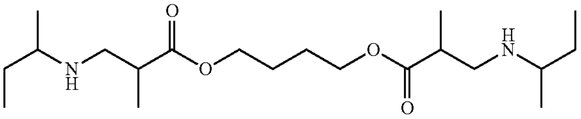
2AB-BDMA-2AB
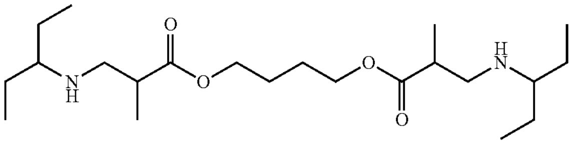
3AP-BDMA-3AP
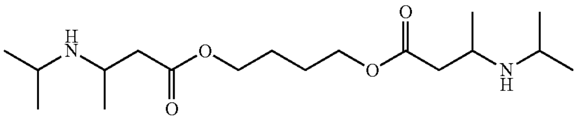
IPA-BDC-IPA
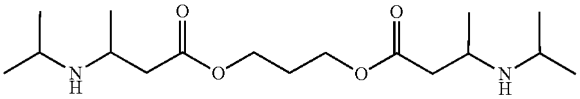
IPA-PDC-IPA
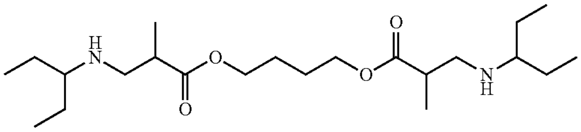
3AP-BDMA-3AP
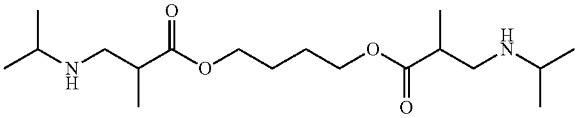
IPA-BDMA-IPA
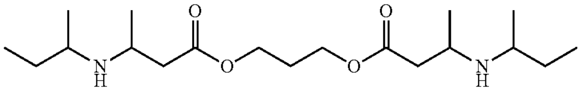
2AB-PDC-2AB
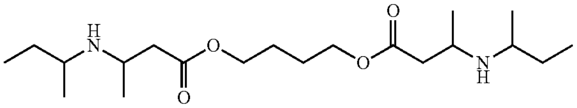
2AB-BDC-2AB -continued
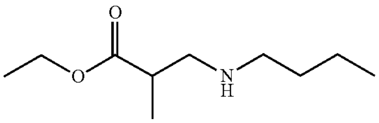
1AB-EMA
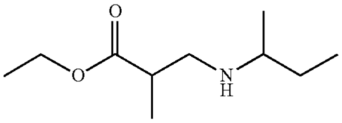
2AB-EMA
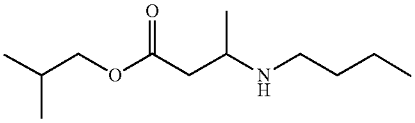
1AB-IBC
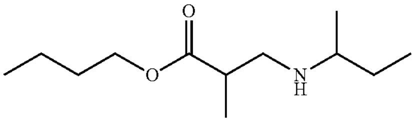
2AB-NBMA
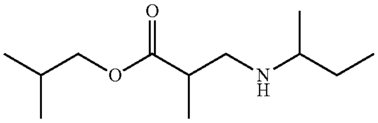
2AB-IBMA
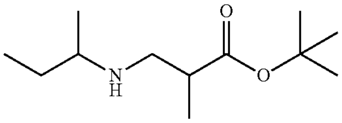
2AB-TBMA
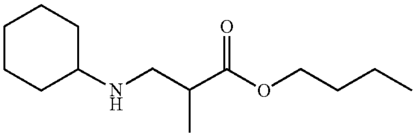
cy6A-NBMA
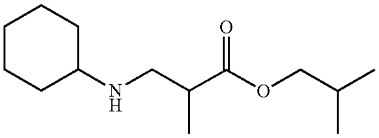
cy6A-IBMA
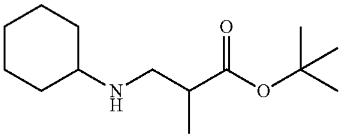
cy6A-TBMA
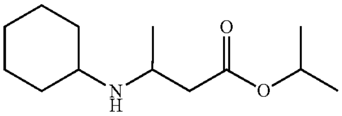
cy6A-IPC
-continued
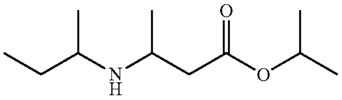
2AB-IPC
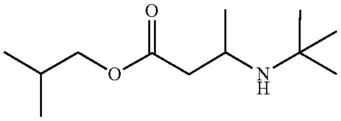
TBA-IBC
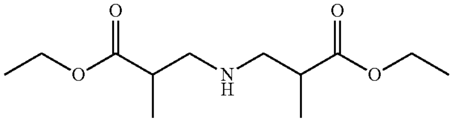
EMA-NH-EMA
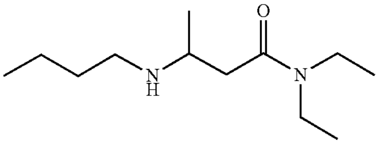
1AB-DECAM
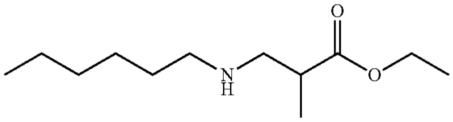
1HA-EMA
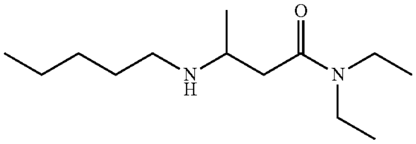
1AA-DECAM
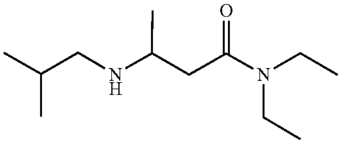
IBA-DECAM
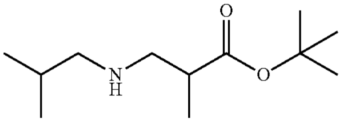
IBA-TBMA
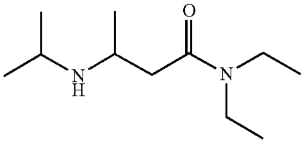
IPA-DECAM
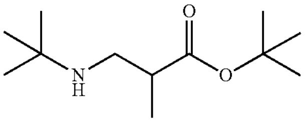
TBA-TBMA -continued

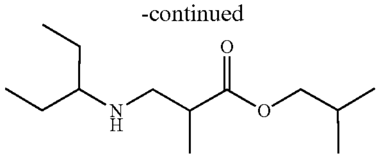

3AP-IBMA

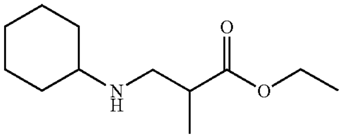

cy6A-EMA

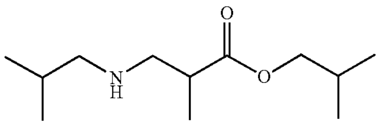

IBA-IBMA

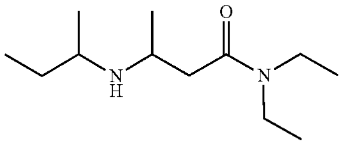

2AB-DECAM

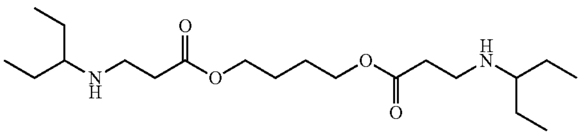

3AP-BDA-3AP

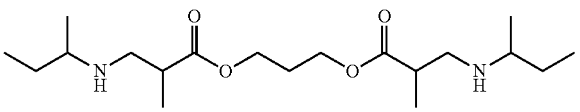

2AB-PDMA-2AB

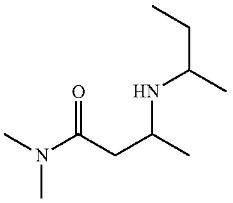

2AB-DMCAM

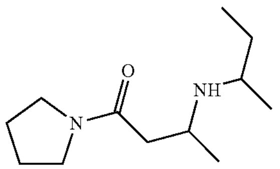

2AB-PYCAM

Space filling modeling showed the steric effects of methyl groups adjacent to the amine site on absorbed $CO_2$ as it interacts with the amine N site. The steric crowding limits the $CO_2$ binding strength of the amine site. The steric effect can be tailored to optimize the $CO_2$ solubility in BAC solvents at the appropriate temperature and pressure conditions while also reducing the energy demands for solvent regeneration The exceptional $CO_2$ solubilities resulting from their hybrid molecular structures along with an ability to tune the strength of $CO_2$ interaction within the BAC family of solvents makes these solvents highly versatile and very-well suited to a wide range of $CO_2$ capture processes. The $CO_2$ absorption isotherm data shown in FIG. 1 for different BAC solvents highlight how the $CO_2$ uptake can be increased in the desired pressure range. Solvents 1AH-EMA, 1AA-IBMA and 1AB-DECAM are optimized for capture at lower partial pressures of $CO_2$ in the range of 0.2-4 bar. Solvents 2AB-DECAM and EMA-NH-EMA are better suited for high pressure $CO_2$ capture as indicated by the working capacity ratio of $CO_2$ uptake at higher pressure to the uptake at the 1 bar regeneration pressure. The EMA-NH-EMA solvent with two ester functional groups has an enhanced $CO_2$ capacity at high pressures typical encountered in precombustion applications. The working capacities of all BAC solvents will be significantly improved by warming the solvent during the regeneration step. The moderate to high heat of $CO_2$ adsorption in the BAC solvents leads to a more pronounced drop in $CO_2$ uptake as the solvent temperature is increased. This effect provides a higher working capacity with only a moderate temperature ramp of 25-50° C. above the absorption temperature.

Figure 2:
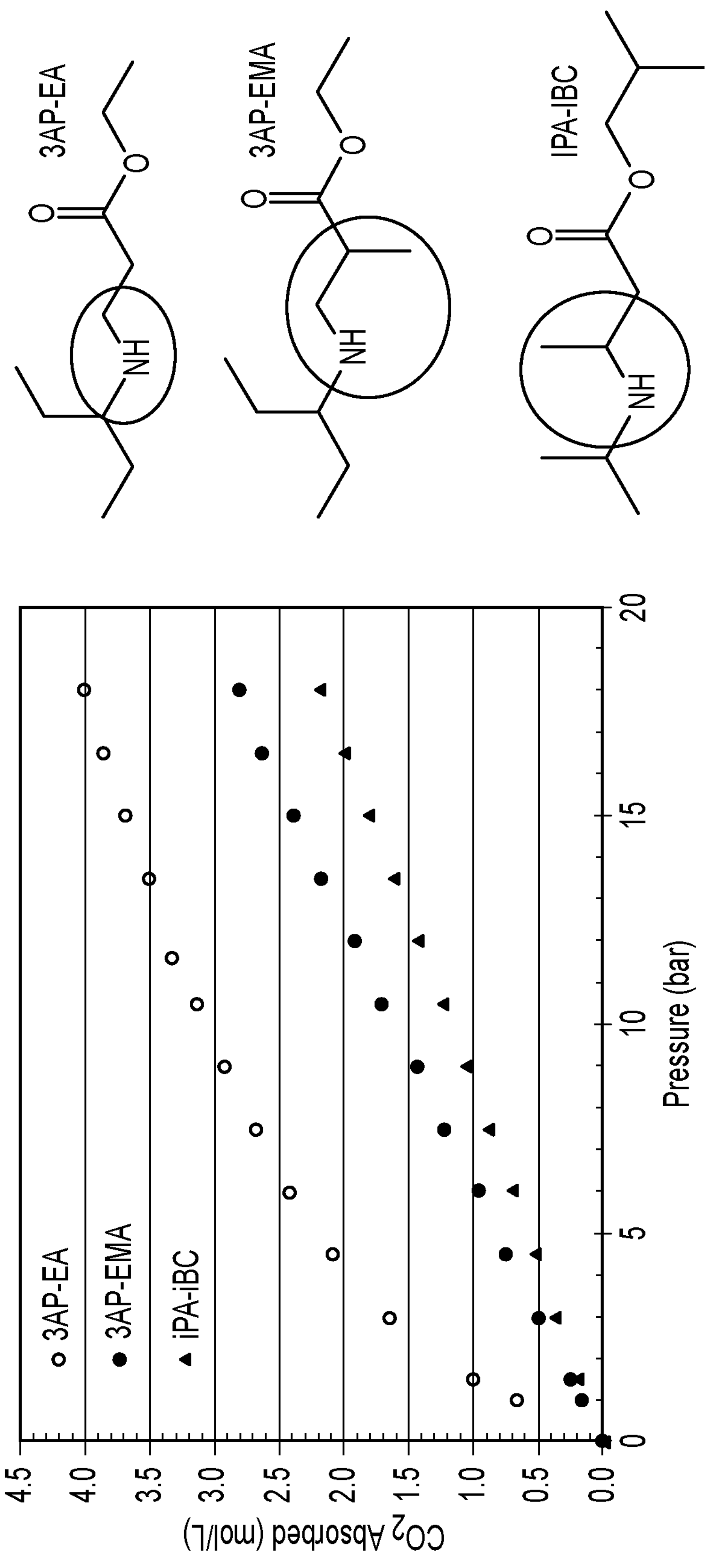
FIG. 2. Comparing $CO_2$ absorption isotherms for different BAC solvents with varying degrees of steric hindrance around the amine site. As the steric crowding around the amine site increases, the $CO_2$ uptake in the low-pressure region of the isotherm decreases. This provides a powerful tool to tailor the structure of BAC solvents to control $CO_2$ solubility at desired temperature and pressure conditions.

The isotherms in FIG. 1 show the advantage of ester groups over amide groups for high $CO_2$ capacity at elevated pressure. The BAC solvents are further tailored through the introduction of steric hinderance around the amine site. The $CO_2$ absorption isotherms in FIG. 2 demonstrate the pronounced effects of steric hinderance on $CO_2$ uptake in a solvent. The least hindered amine, 3AP-EA, shows the strongest $CO_2$ uptake in the low-pressure region of the isotherms and produces a pronounced nonlinear isotherm. Addition of a methyl group two carbons from the amine nitrogen in 3AP-EMA significantly reduces the low-pressure $CO_2$ uptake and produces a nearly linear isotherm. Placement of the methyl group on the carbon next to the amine nitrogen in the IPA-IBC sample further reduces the low-pressure $CO_2$ uptake and yields a linear isotherm as typically seen in pure physical solvents. The steric crowding has essentially neutralized the amine nitrogen binding interaction with $CO_2$.

Figure 3:
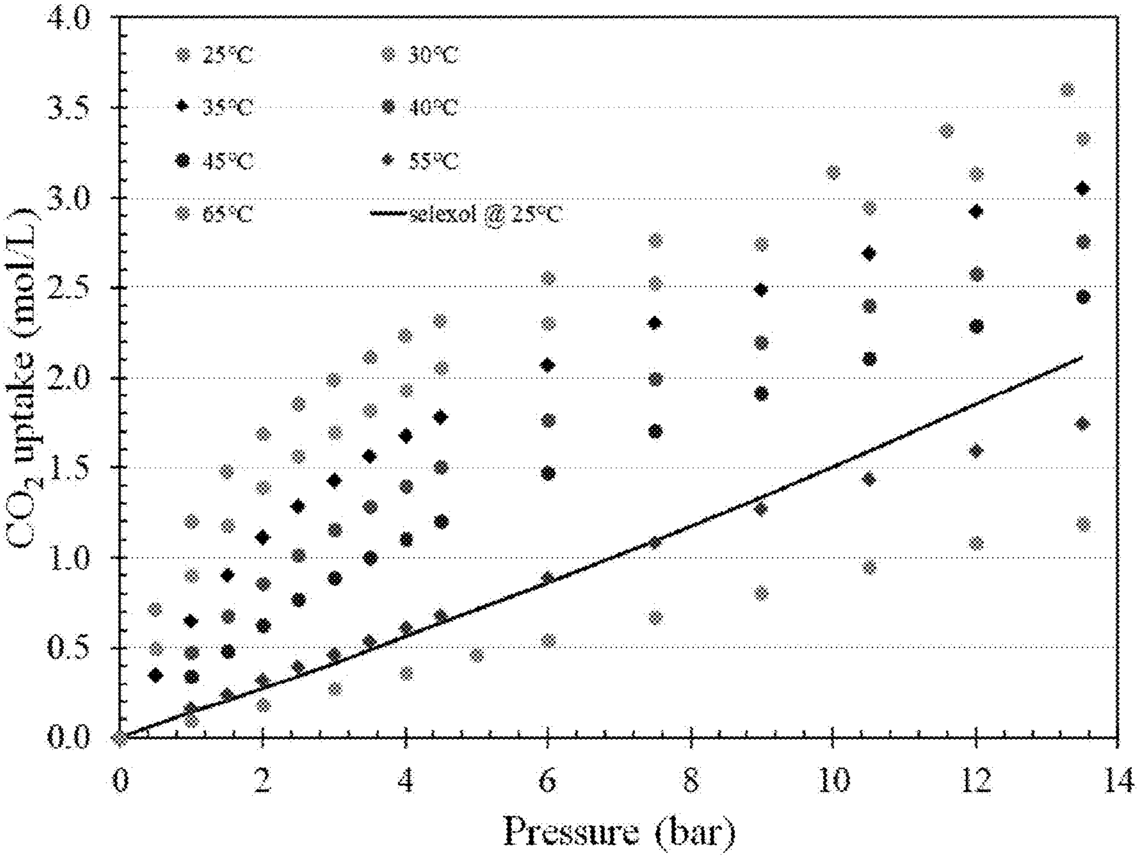
FIG. 3. Temperature effects on the $CO_2$ absorption isotherms for BAC solvent IBA-DECAM. A linear adsorption isotherm for the physical solvent Selexol at 25° C. is included for comparison.

The incorporation of an amine functional group into the solvent adds a variable degree of chemisorptive qualities to the $CO_2$ interaction with the solvent. The higher heat of absorption for $CO_2$ in the BAC solvent instills a higher sensitivity of the $CO_2$ solubility to changes in temperature. The effects of temperature on the shape of the $CO_2$ absorption isotherms are demonstrated in FIG. 3 for solvent IBA-DECAM. The $CO_2$ uptake at 25-35° C. is highly non-linear with a steep slope to the isotherm in the low-pressure region that transitions to a linear shape at higher pressures. A small ramp in temperature above 45° C. has a dramatic effect on the isotherm shape, effectively flattening the chemisorption region at low pressure and producing a near linear isotherm over the entire pressure range. Only a small temperature change was required to effectively transform the solvent from a mixed chemisorption/physisorption to a quasi-physisorption mechanism. This ability to flatten the $CO_2$ absorption curve with a modest temperature ramp is highly beneficial for increasing the working capacity of the solvents since solvent regeneration is typically performed at 1 bar. Thus, high absorption capacity for $CO_2$ can be achieved at an optimal absorption temperature which takes advantage of the strong amine-$CO_2$ interactions with the release of $CO_2$ in the regeneration step significantly enhanced with only mild to moderate heating of the solvent. Very high $CO_2$ working capacities can be achieved in most BAC solvents using a thermal swing of only 25-50° C. above the absorption temperature.

The BAC solvents have a unique advantage in possessing an inherent boost in $CO_2$ capacity due to an enhanced interaction with the carboxylate and hindered amine sites. These two effects combine to increase both the low-pressure and higher-pressure $CO_2$ solubility in the solvents. Thus, the solvents can be optimized for applications involving capture of $CO_2$ at lower partial pressures such as encountered in biogas/landfill gas,[8-22] cement production[23-24] and steel production or for applications involving higher partial pressure of $CO_2$ such as $H_2$ and NH3 production.[7] The benefits of these solvents will now be discussed in two contrasting applications as examples of their unique properties. The first demonstration will involve pre-combustion $CO_2$ capture in a reforming process which generates $H_2$ as fuel for a turbine in an Integrated Gasification Combined Cycle (IGCC) power plant where $CO_2$ is at an elevated partial pressure of 20-25bar at ~50% concentration in $H_2$. The second example will be for biogas methane upgrading which is typically performed at $CO_2$ partial pressures near 2.5 bar at ~35% concentration in methane.

Example 1: Pre-Combustion $CO_2$ Capture

Figure 4:
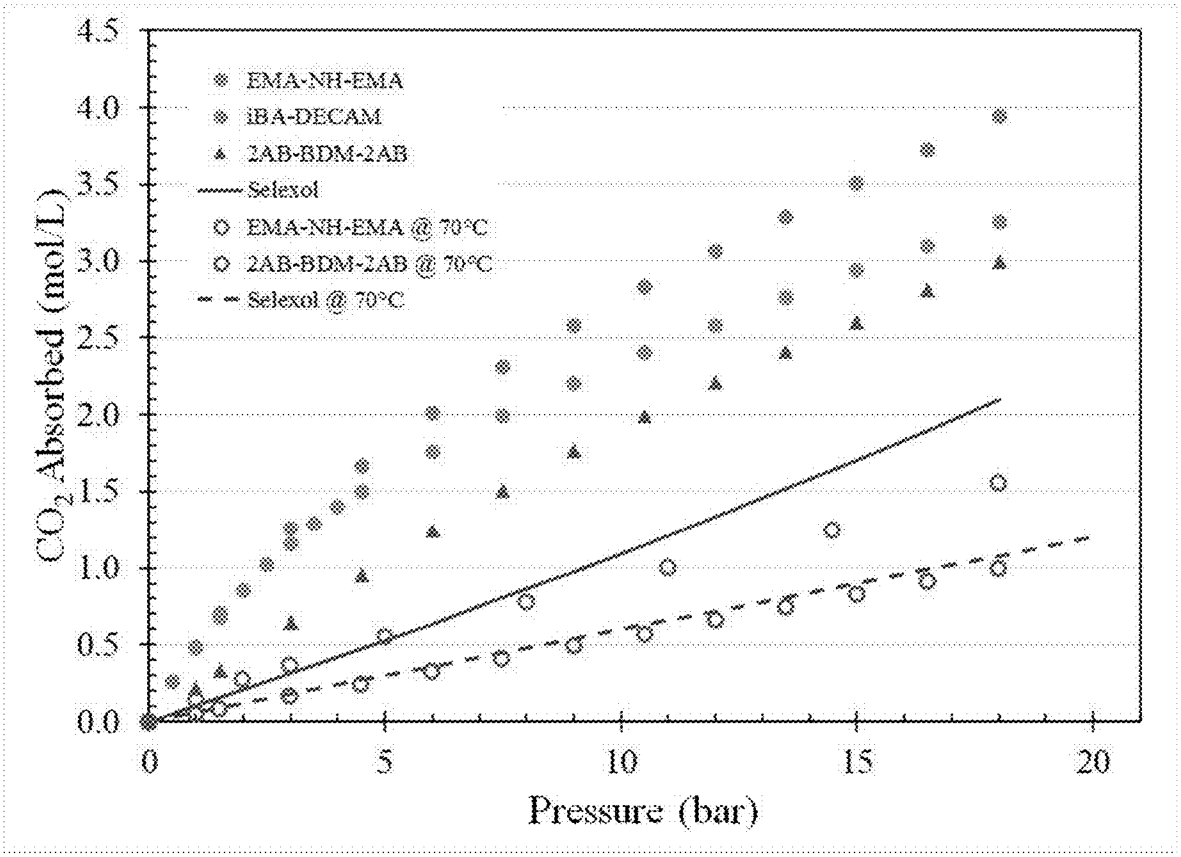
FIG. 4. (left) $CO_2$ absorption isotherms at 40° C. and 70° C. for BAC solvents compared to those obtained for the commercial hydrophilic physical solvent Selexol. The enhanced $CO_2$ interaction with BAC solvents provides the opportunity for $CO_2$ capture under warm gas conditions. The higher heat of $CO_2$ absorption in EMA-NH-EMA and 2AB-BDM-2AB provide a significant drop in $CO_2$ loading at 1 bar with moderate warming and provides an efficient route to high working capacities.

Physical solvents are ideally suited to $CO_2$ capture under precombustion conditions due to the higher partial pressure of $CO_2$ involved (20-25 bar).[6-7] The solvents are typically chilled to further maximize the $CO_2$ solubility even though solvent chilling introduces energy penalties associated with the higher solvent viscosity and chiller operation. Operations at warmer temperatures with similar $CO_2$ solvent capacity would thus be beneficial. As shown in FIG. 4, BAC solvents provide much higher $CO_2$ solubilities under warm gas condition than typically observed for physical solvents. The combined influences of carboxylate and hindered amine functional groups enhance $CO_2$ absorption over the full range of the isotherms. The hindered beta-amine site gives a rapid rise in $CO_2$ solubility in the 1-5 bar region, with the carboxylate groups aiding in $CO_2$ absorption through the remainder of the pressure ramp. Absorption above ~12 bar becomes very linear as the amine-based absorption saturates and physical absorption due to the carboxylate contribution dominates. The combined effects of the solvent functional groups result in a $CO_2$ uptake at 20 bar which is nearly double that of the commercial standard Selexol at 40° C. A 30° C. temperature swing during regeneration effectively reduces the low-pressure $CO_2$ solubility and provides a high working capacity of 2.5 mol/L for regeneration at 1 bar, 70° C. The working capacity can be increased further to 4.1 mol/L if the absorption temperature is dropped to 25° C. In pre-combustion $CO_2$ capture processes, the $CO_2$ recovery is typically done in stages using flash tanks to step down the pressure and allow recovery and recycling of co-adsorbed $H_2$. The unique $CO_2$ absorption properties of BAC solvents could allow the flash tanks to operate at different temperatures to maximize the purity of recovered $H_2$ by limiting the co-release of absorbed $CO_2$.

Figure 5:
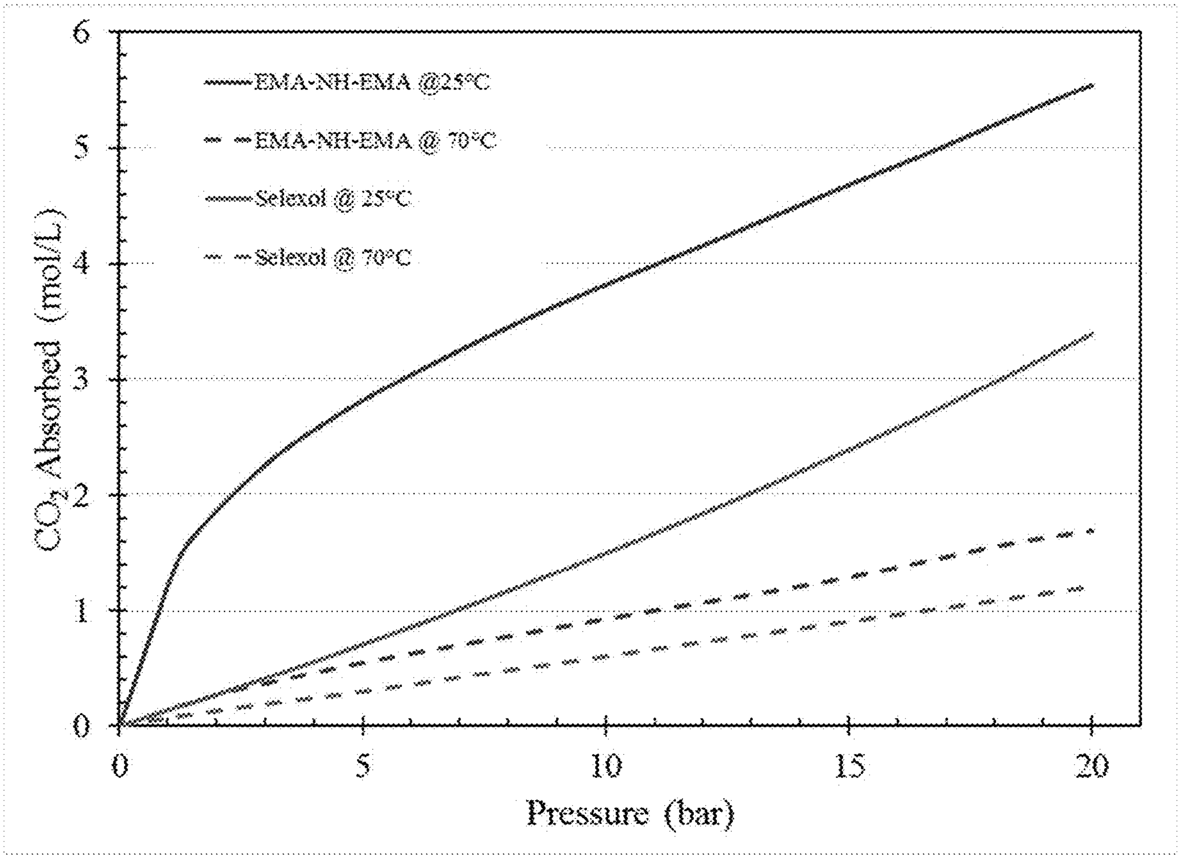
FIG. 5. Comparing $CO_2$ absorption for EMA-NH-EMA to a standard commercial physical solvent Selexol at 25° C. and 70° C. A large increase in $CO_2$ uptake at 20bar is observed in EMA-NH-EMA at 25° C., whereas the uptake in both solvents is similar at 1 bar and 70° C. regeneration condition. The $CO_2$ absorption profile for EMA-NH-EMA provides a high $CO_2$ working capacity without the need for solvent chilling.

The higher heat of $CO_2$ absorption in the EMA-NH-EMA compared to a typical physical solvent such as Selexol offers other potential advantages in system design for $CO_2$ removal. With a higher heat of absorption, the $CO_2$ uptake in the solvent is more effected by temperature swing. As such, the $CO_2$ solubility in EMA-NH-EMA drops significantly more than in Selexol with a ramp in temperature. This temperature sensitivity provides a means for regeneration of the solvent using only a change in temperature without a need for a drop in pressure. Referring again to the isotherms shown in FIG. 5, it is clear that a significant $CO_2$ working capacity of 3.8 mol/L can be achieved with EMA-NH-EMA by simply regenerating the solvent at 20 bar, 70° C. The potential to recover $CO_2$ at pressures near the absorber pressure of 20-25 bar could provide substantial energy savings over the traditional pressure swing process of recovering the $CO_2$ at 1.5 bar since compression of the recovered $CO_2$ prior to pipeline injection is a significant energy penalty in $CO_2$ removal processes. The work required for compression of a gas follows a logarithmic correlation with pressure. Thus, compression of $CO_2$ to the liquification pressure of 70 bar when starting at 20 bar requires 67% less energy than required for compression starting at 1.5 bar. Additional energy savings are also possible with high pressure $CO_2$ recovery due to the reduction in recompression demand on the $CO_2$ capture system gas after solvent regeneration.

High Molecular Weight Solvents with Reduced Volatility

A subgroup of BAC solvents was created which contain two beta-amino carboxylate groups per molecule. These solvents were prepared from diacrylate derivatives which have a terminal double bonds and internal ester groups (bottom right in Scheme 1). The bis-(amino) nature leads to solvents with higher molecular weights. The higher molecular weights of the solvents result in projected boiling points >300° C. and very low vapor pressures, but higher room temperature viscosities. The high-boiling solvents were designed for applications where $CO_2$ capture, and solvent regeneration could be accomplished at elevated temperatures with little solvent loss due to evaporation. One potential benefit to this application window would be in the ability to regenerate the solvent at elevated pressures using a temperature ramp as discussed above with only negligible solvent loss due to evaporation. High-boiling solvents allow higher regeneration temperatures and thus higher working capacities for regeneration at elevated pressures. As discussed above in reference to the isotherm data in FIG. 5, the high $CO_2$ uptake in EMA-NH-EMA offers an attractive option of regenerating the solvent at elevated pressure. For higher molecular weight/higher viscosity solvents such as BAC solvent 2AB-BDM-2AB the absorption will require warmer temperatures to lower the solvent viscosity. This will lower the working capacity but savings due to reduced solvent loss, removal of solvent chilling, and high pressure recovered $CO_2$ may offset the reduction in working capacity. The working capacity of 2AB-BDM-2AB for $CO_2$ capture at 40° C., 20 bar followed by regeneration at 70° C., 20 bar still gives a relatively high working capacity of 2.1 mol/L. It's notable that the estimated working capacity for regeneration at 20 bar in BAC solvents can exceed the total absorbed amount of $CO_2$ at 20 bar in the traditional physical solvents when operated at 40° C.

Example 2: $CO_2$ Removal for Biogas Upgrading with BAC Solvents

Biogas methane is formed through the anaerobic digestion of municipal or agricultural waste.[8-22] The gas generated in the digestor averages 35% $CO_2$ with the balance mostly methane. (Note that landfill gas can have significantly higher concentrations of $N_2$ which would also need to be removed from the product $CH_4$ gas in a separate stage from the $CO_2$ capture.) In most commercial solvent processes, capture of the sub-ambient pressure $CO_2$ in the biogas is facilitated by pressurizing the system to 6-8bar to give a $CO_2$ partial pressure of approximately 2.5 bar. $CO_2$ is then removed using a circulating solvent system which typically uses water, or in some cases Selexol. Compression of the biogas is required due to the low $CO_2$ solubility in water and Selexol. Compression of the biogas adds to the energy demands of the process and increases the $CH_4$ solubility in the $CO_2$ removal solvent. As such, BAC solvents with significantly higher $CO_2$ solubility at low partial pressures of $CO_2$ could reduce or even remove the need for compression of the feed gas and thus reduce the energy demands of the treatment process. The benefits for BAC solvents in biogas upgrading can be summarized as follows: high $CO_2$ removal capacity without pressurization of biogas; low pressure operation reduces $CH_4$ co-absorption in solvent; high $CO_2$ capacity reduces size of absorber; high purity of recovered $CO_2$; and mild solvent regeneration conditions.

Figure 6:
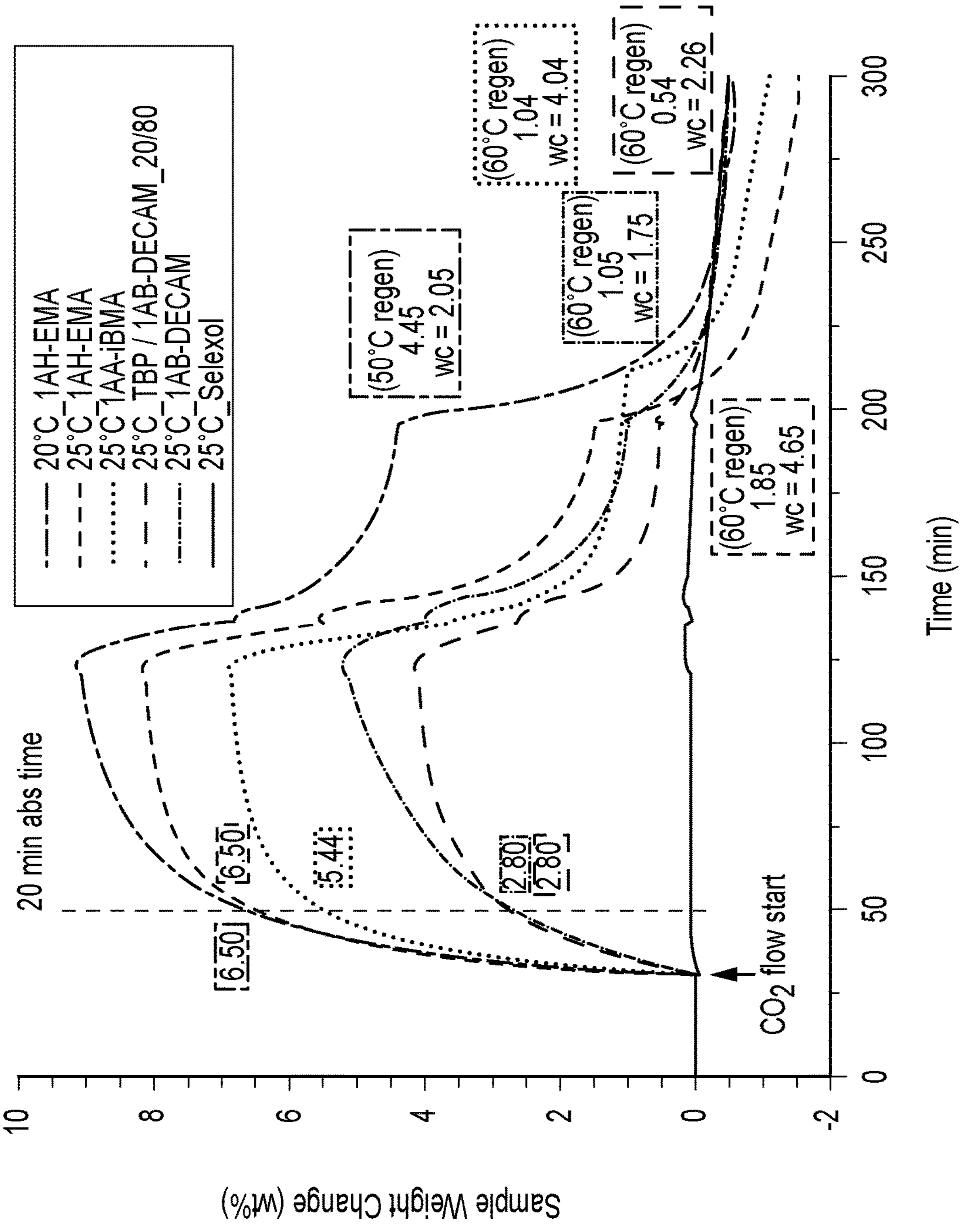
FIG. 6. $CO_2$ absorption profiles for different BAC solvents and Selexol under simulated biogas conditions of $P_{CO2}$ 300 mbar/$P_{N2}$ 700 mbar showing relative $CO_2$ mass transfer rates, effect of regeneration temperature, relative evaporation rates and approximate solvent working capacities after 20 min. absorption time (chosen to coincide with $CO_2$ diffusion rates in Selexol). Note that working capacities for Selexol under these conditions is effectively 0 wt % since $CO_2$ uptake at 60° C., 1 bar is slightly higher than the $CO_2$ uptake at 25° C., 300 mbar. As such, effective use of Selexol requires compression of the feed gas to $P_{total}$ 6-8 bar. (TBP=tributyl phosphate)

To demonstrate the effectiveness of BAC solvents at removing $CO_2$ under ambient conditions, $CO_2$ absorption tests were run at 25° C. using a flowing 30/70 mixture of $CO_2/N_2$ at a total pressure of 1 bar. Note that Selexol is ineffective under these conditions since the $CO_2$ solubility at the regeneration condition ($P_{CO2}$ 1 bar, 60° C.) is slightly higher than the $CO_2$ solubility at the capture condition ($P_{CO2}$ 300 mbar, 25° C.). The working capacity of Selexol is essentially 0 wt % when the feed gas is not compressed above ambient pressure. In contrast, pure BAC solvents 1AHEMA, 1AA-iBMA and 1AB-DECAM, and a blended BAC solvent TBP/1AB-DECAM (TBP=tributyl phosphate) consisting of 20 wt % TBP and 80 wt % 1AB-DECAM all show very high $CO_2$ uptakes under these conditions. Working capacities (WC) are indicated on the chart using conservative estimates of the absorbed amounts of $CO_2$ after a 20-minute time window corresponding to the approximate time required for $CO_2$ saturation in Selexol. Note that even higher working capacities are possible with extended $CO_2$ contact times with the solvent. The working capacities are also variable depending on choice of regeneration temperature. The ultimate choices of absorption and regeneration temperatures would be guided by system parameters including $CO_2$ mass transfer rates and solvent evaporation rates. The results presented in FIG. 6 highlight the exceptional improvements in $CO_2$ working capacities possible with BAC solvents compared to traditional physical solvents, but the conditions of the test were not optimized to any particular system design. The BAC solvent with the highest $CO_2$ uptake at $P_{CO2}$ 300 mbar is 1AH-EMA. The low viscosity of the solvent leads to fast mass transfer. Absorption tests at 20° C. and 25° C. indicate that the ultimate $CO_2$ capacity is higher at 20° C., however the $CO_2$ uptake in the first 20 minutes is nearly identical between the two temperatures. The optimal temperature of the absorber would thus depend on the ideal balance of mass transfer rate and $CO_2$ solubility.

Figure 7:
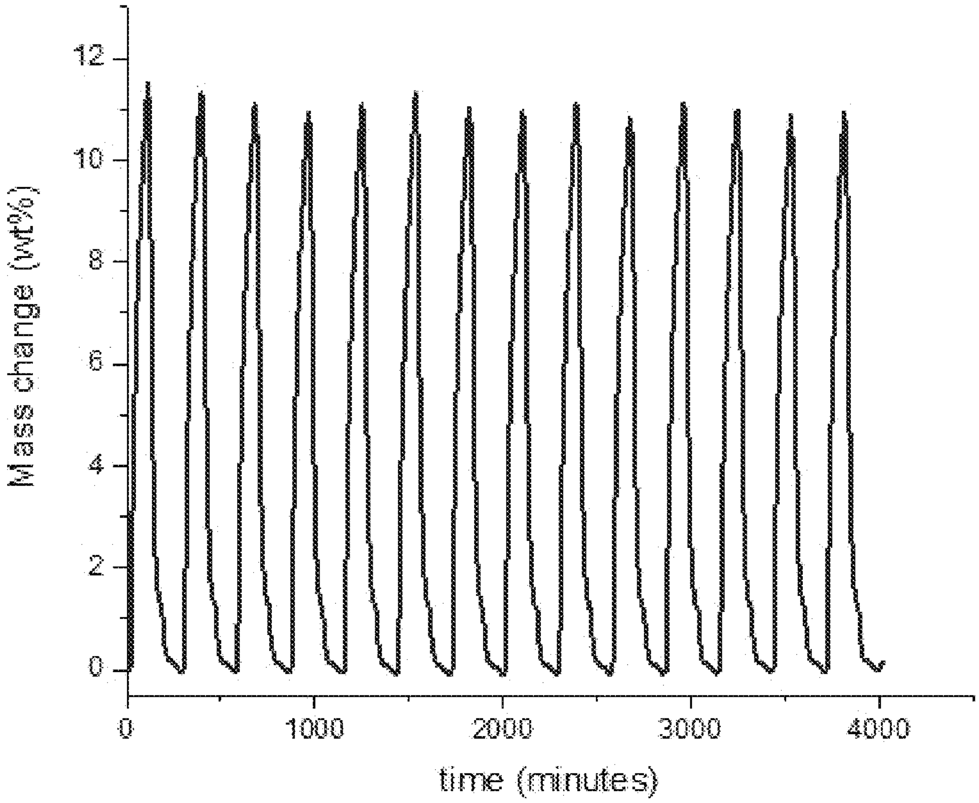
FIG. 7. Cycling stability test for 1AB-DECAM. One cycle includes absorption at $P_{CO2}$ 300 mbar, 25° C., 70% RH, followed by regeneration at $P_{CO2}$ 1bar, 60° C., 0% RH, followed by $N_2$ sweep at 1 bar, 60° C., then back to dry $N_2$ baseline at 25° C.

Solvent stability was evaluated for BAC solvents under simulated absorption/desorption cycling. The results of a cycling test for BAC solvent 1AB-DECAM is shown in FIG. 7. While a typical biogas upgrading process will involve a dehumidification step prior to the $CO_2$ removal step, the 1AB-DECAM stability study was done under a more rigorous condition of 70% relative humidity to ensure sample stability in the presence of moisture. Thus, the sample was exposed to a cycle consisting of a dry $N_2$ baseline purge, followed by exposure to moist $CO_2$ (30% dry $CO_2$/70% wet $N_2$; $P_{tot}$ 1bar) at 25° C. for 90 minutes, then heated to 60° C. under flowing dry $CO_2$ at 1bar for 60 minutes, then purged at 60° C. with dry $N_2$ for 60 minutes, followed by cooling back to 25° C. to return to the baseline condition before repeating the cycle. The sample was cycled 14 times for a total run time of 4,000 min (67 hrs). No measurable drop in solvent performance relevant to $CO_2$ capacity was observed over the length of the test.

Figure 9:
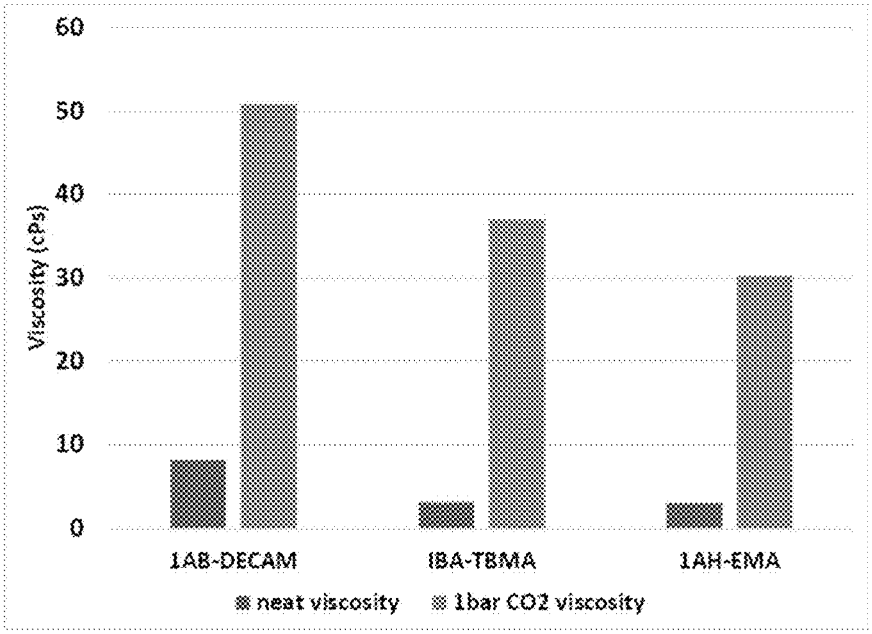
FIG. 9. Viscosity changes in BAC solvents between neat and $CO_2$ loaded phases after saturation at 1 bar. Note that projected uses of the solvents are targeted for $P_{CO2}$ 0.2-0.4 bar which will result in even lower $CO_2$ loaded viscosities.

Additional testing was done to determine the effect of moist $CO_2$ on the absorption and the ability to regenerate BAC solvent 1AH-EMA since the presence of significant amounts of water in amine/$CO_2$ mixtures can lead to the formation of carbonates which require more energy input to regenerate $CO_2$. As noted earlier, typical biogas processing involves a water removal step prior to the $CO_2$ removal step so moisture levels in the biogas feed are expected to be well below the levels used in the 1AH-EMA evaluation. The tests were designed to include higher moisture levels to ensure the solvent is stable. The results of the water vapor absorption and wet $CO_2$ absorption tests with 1AH-EMA are summarized in FIG. 9. Tests using humidified $N_2$ showed very low levels of water vapor absorption in 1AH-EMA. The solvent is relatively hydrophobic showing only ~1.55 wt % of water vapor absorbed at 80% relative humidity at 25° C. The mass changes in the solvent were determined at 25° C. using humidified $N_2$, dry 30/70 $CO_2/N_2$ mixture and humidified 30/70 $CO_2/N_2$ mixtures with varying amounts of humidity added at a total pressure of 1 bar. Under dry conditions, the mass change in the solvent under a 30/70 $CO_2/N_2$ mixture is 8.15 wt %. This weight change is due to $CO_2$ absorption in the solvent. Water vapor absorption from humidified $N_2$ streams lead to weight changes of ~0.4 wt % at 30% RH, 0.8 wt % at 50% RH, and 1.3 wt % at 70% RH. When the solvent was exposed to humidified $CO_2$, the total mass change was slightly higher than expected from the combined values of water vapor and $CO_2$ determined from the independent runs. For example, in the humidified $CO_2$ run at 30% RH, the total mass gained was 8.90 wt %, slightly larger than the sum of water vapor (0.4 wt %) and $CO_2$ (8.15 wt %) absorption observed in the pure runs. This trend was slightly more pronounced at higher humidity levels. At this point it is unknown whether the presence of $CO_2$ enhances water vapor absorption or if the presence of water vapor enhances the uptake of $CO_2$. Attempts to answer this question via in situ FTIR tests were inconclusive.

Figure 8:
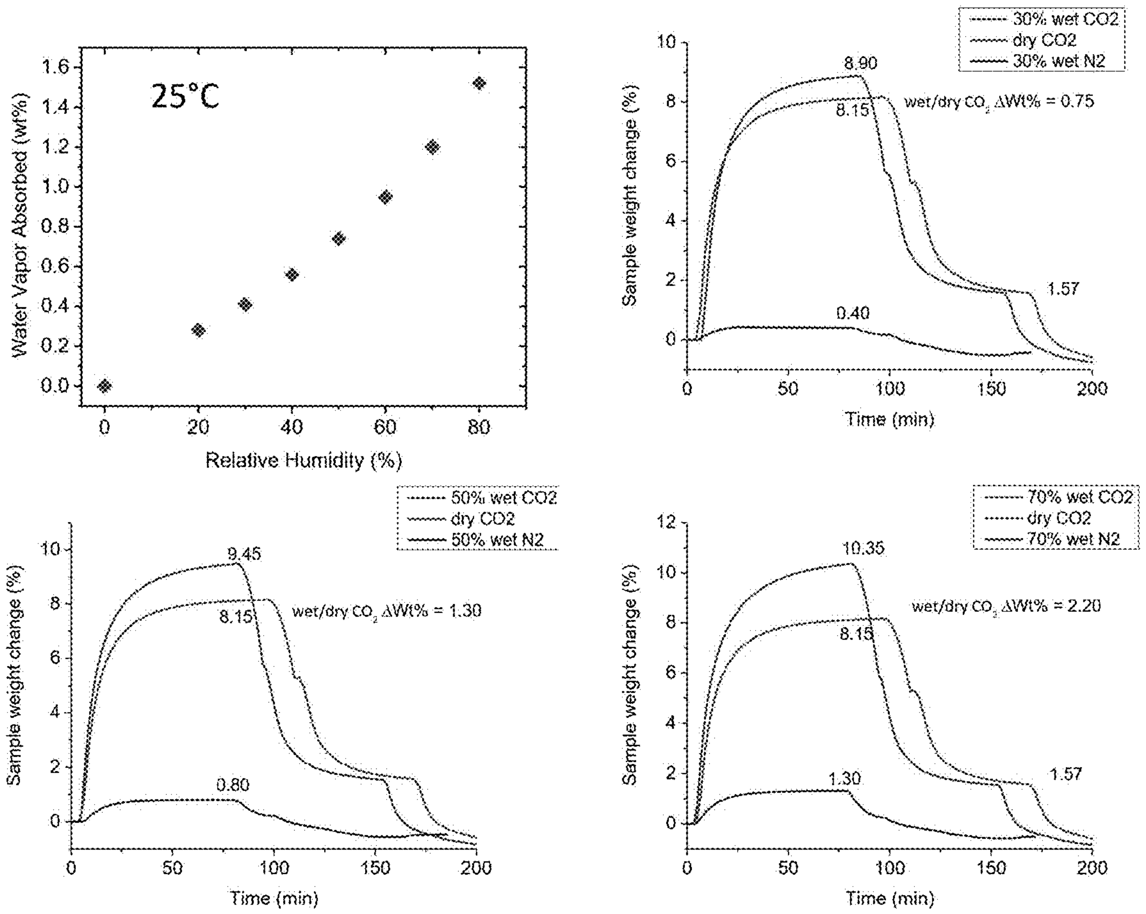
FIG. 8. Water vapor absorption and relative mass changes in BAC solvent 1AH-EMA under various humidity conditions of $N_2$ and $CO_2/N_2$ mixtures relevant to typical biogas conditions. (top left) Water vapor absorption was measured under continuous flow at 1 bar, 25° C. using blends of humidified $N_2$ and dry $N_2$. Wet and dry $CO_2$ runs were measured at 25° C. in continuous flow using mixtures of $P_{CO}$=300 mbar, $P_{N2}$=700 mbar with humidity controlled by blending humidified $N_2$ and dry $N_2$. Solvent regeneration was done first at 1bar $CO_2$, 60° C. to get a working capacity, then followed by a 1 bar $N_2$ sweep at 60° C. to determine baseline mass. A high working capacity can be achieved with $CO_2$ recovery accomplished under a pure $CO_2$ sweep at 1 bar, 60° C. without the need for steam stripping, high temperatures, vacuum, or an inert purge gas.

The results shown in FIG. 8 confirm that the presence of water in the $CO_2$ stream does not affect the ability to regenerate the solvent. Regeneration of the solvent under 1 bar of dry $CO_2$ at 60° C. proceeded equally when the $CO_2$ absorption was done under dry or wet conditions. The similarity in regeneration behavior for the wet and dry $CO_2$ tests are strong evidence that the presence of moisture in the gas stream does not induce the formation of stable bicarbonates or carbonates. Additional evidence for this conclusion was obtained by in situ FTIR studies and will be discussed in detail below. Thus, residual moisture in the gas will not negatively impact the $CO_2$ performance of the BAC solvent. The effect of co-adsorbed water will mainly be a system level impact involving pumping cost and the need to dry the $CO_2$ prior to sequestration. The BAC solvents are thus flexible to humidity requirements that the system demands. Reducing the energy penalties involved for aqueous amine solvents is a common motivation for the development of non-aqueous $CO_2$ capture solvents. Research in this area is often referred to in the literature as "water lean" amine solvents.[4-5] One prevalent barrier to progress in these endeavors is the large increase in solvent viscosity that typically accompanies $CO_2$ absorption in water lean amine solvents. The increase in viscosity can be several orders of magnitude which leads to major penalties in $CO_2$ mass transfer rates and pumping costs. To evaluate the effect of $CO_2$ loading on viscosity, three BAC solvents were tested after saturation with $CO_2$ at 1 bar, 25° C. The results are shown in FIG. 8. All three solvents showed only modest increases in viscosity in the $CO_2$ loaded phase compared to the neat phase, but much lower than typically reported for other water lean amine solvents. The 1AH-EMA solvent showed the smallest $CO_2$-loaded viscosity, even though the solvent has the highest $CO_2$ uptake under the test conditions. It is important to note that the viscosity measurements were done on solvents saturated with $CO_2$ at 1 bar due to equipment constraints. In some projected applications of these solvents, e.g., biogas upgrading, the partial pressure of $CO_2$ will be significantly below 1 bar and as such the $CO_2$ loading will be smaller as well. As such, the $CO_2$-loaded solvent viscosities under process conditions are projected to be 30-50% lower than those shown in FIG. 8.

Water Solubility.

Water solubility in $CO_2$ solvents is an important property to consider. High water solubility can be beneficial in some applications where co-removal of water and $CO_2$ from the gas being upgraded is desired. This approach is often applied in natural gas upgrading where hydrophilic solvents such as Selexol, NMP, and propylene carbonate are designed to aid in dehydration of the sour gas. In other applications, such as pre-combustion $CO_2$ capture, co-adsorption of water with the captured $CO_2$ is not desired since water is needed for the combustion system, water reduces the $CO_2$ capacity of the solvent, increases the pumping cost of the solvent, and must be removed from the captured $CO_2$ prior to injection into the transmission pipeline to the sequestration site. Thus, control of water solubility is important in $CO_2$ solvent design depending on the targeted application. Water solubility in BAC solvents can be controlled to a significant degree depending on the nature of the carboxylate and amine functional groups. In general, esters are more hydrophobic than amide functionalized BAC solvents. For example, a humidification chamber study on ester solvent EMA-NH-EMA and amide solvent 1AB-DECAM showed that EMA-NH-EMA absorbed 25 wt % of water and 1AB-DECAM absorbed 54 wt % of water after 200 hours of continuous exposure to 90% relative humidity at room temperature. Note that these evaluations were done under extreme conditions. In an actual solvent looping process, the majority of the moisture would be removed from the feed gas prior to the $CO_2$ removal step and contact times with the solvent would be much shorter with regeneration of the solvent performed after each absorption step.

Stability/Performance in the Presence of Water.

Figure 10:
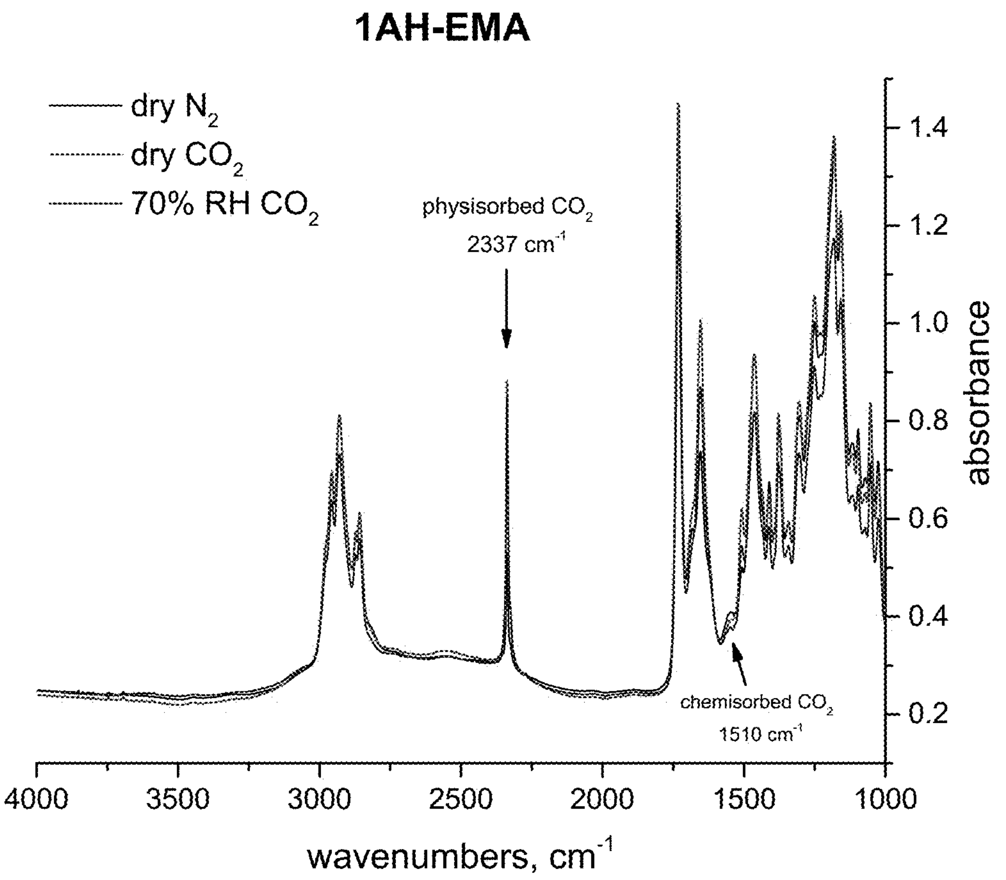
FIG. 10. FTIR spectra of 1HA-EMA under dry $N_2$, dry $CO_2$, and 70% relative humidity $CO_2$ showing physisorbed and chemisorbed $CO_2$, but no carbamate/carbonate side products.

Some carbon capture solvents containing amines undergo side reactions to form solid carbamates, bicarbonates or carbonates, particularly in the presence of water. The formation of these unwanted compounds increases the energy demand of the solvent regeneration step, reduces the capacity of the solvent by converting a portion of it irreversibly, and diminishes the amount of solvent available for reversible $CO_2$ capture. The formation of solids can also increase solvent viscosity, clog solvent pumps, and foul system channels causing downtime. Samples of pure BAC solvents were studied by FTIR spectroscopy under both dry and wet $N_2$ and $CO_2$, repeatedly cycling between these conditions. The results showed that while evidence of both physisorbed and chemisorbed $CO_2$ was seen in all BAC solvents, the amount of $CO_2$ absorbed was not diminished in the presence of water nor were any irreversible side products observed; sample spectra always reverted to their original appearance after purging with dry $N_2$. Results obtained for BAC solvent 1AH-EMA are shown in FIG. 10.

High Pressure $CO_2$ Removal Processes

For high pressure $CO_2$ removal processes in pre-combustion applications, the commercial solvent of choice is Selexol. The absorption process takes advantage of the highly reversible nature of $CO_2$ absorption in the physical solvent by using a pressure swing adsorption/desorption cycle along with solvent warming. The $CO_2$ is captured from a high partial pressure stream consisting of ~50/50 mixture of $CO_2$ and $H_2$ at a total pressure near 50 bar. The absorber operates at 10° C. to enhance the volumetric $CO_2$ solubility and reduce the size of the absorption column. The absorbed $CO_2$ is then released near 25° C. in a series of flash tanks which step down the pressure to about 1.5 bar. Once the $CO_2$ is recovered, it needs to be cleaned and then recompressed to 1500-2200 psi to transport it via pipeline for geologic storage, enhanced oil recovery, or $CO_2$ utilization.

Figure 11:
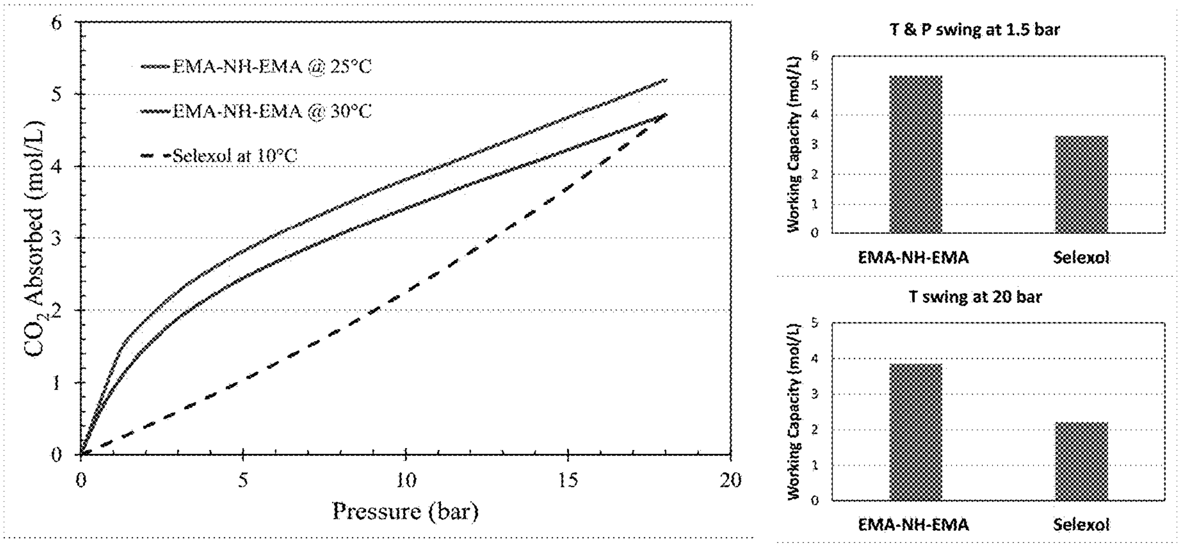
FIG. 11. (left) Comparing $CO_2$ uptake in BAC solvent EMA-NH-EMA at temperatures 15° C. and 20° C. higher than that of Selexol. (Right) comparing theoretical $CO_2$ working capacities of EMA-NH-EMA and Selexol (top) using a combined temperature and pressure swing process with capture at 25° C., 20 bar and regeneration at 70° C., 1.5 bar or (bottom) using a high-pressure temperature swing process with capture at 25° C., 20 bar and regeneration at 70° C., 20 bar. BAC solvent EMA-NH-EMA outperforms Selexol in theoretical working capacity in either case using the same conditions. The high-pressure solvent regeneration is particularly attractive as a means to reduce $CO_2$ compression costs prior to pipeline injection.

Tailored BAC solvents are designed to improve the efficiency of the process by providing high $CO_2$ capacity without the need for solvent chilling while also providing a means for reducing compression costs of the recovered $CO_2$ by regenerating the solvent at or near the absorber pressure using a moderate temperature ramp. The contrast in $CO_2$ uptake at different temperatures between BAC solvent EMA-NH-EMA and Selexol are shown in FIG. 11. For a capture process operating at a $P_{CO2}$ of 20 bar, the EMA-NH-EMA solvent can achieve the same volumetric $CO_2$ uptake at 25° C. as observed for Selexol at 10° C. The results indicate that replacement of Selexol with EMA-NH-EMA could remove the need for solvent chilling and save on energy costs. Additional energy saving could be achieved when considering that dehydration of absorbed water from Selexol requires heating to 80° C. or higher. A similar temperature ramp can be applied to EMA-NH-EMA for recovery of absorbed $CO_2$. A working capacity of >5 mol/L is theoretically possible with an absorption step at 25° C., 20 bar if a combined temperature and pressure swing is applied in the regeneration with heating to 70° C. and the pressure dropped to 1.5 bar. The working capacity of Selexol using the same conditions would be slightly above 3 mol/L. An alternative option is to take advantage of the higher $CO_2$ heat of absorption in EMA-NH-EMA and do the regeneration at the same pressure as the absorber using only a temperature swing. A working capacity of 3.9 mol/L is theoretically possible with an absorption step at 25° C., 20 bar using only a temperature swing to 70° C. in the regeneration with the pressure maintained at 20 bar. Selexol under these conditions would only yield a working capacity slightly above 2 mol/L. To put these results into further perspective, system modeling studies for $CO_2$ capture in an IGCC powerplant uses Selexol with an absorber temperature of 10° C. and desorption down to 1.5 bar at 25° C. Under these conditions, the theoretical working capacity of Selexol would be approximately 4.5 mol/L. However, Selexol will still require heating to desorb water since the solvent is quite hydrophilic. Thus, EMA-NH-EMA offers two alternative strategies providing similar $CO_2$ working capacities where either solvent chilling is removed, or decompression of gas in the recovery step is reduced or removed. Either alternative could lead to savings in both capital and operation costs.

Low to Intermediate $CO_2$ Pressure Processes

A number of commercially important processes generate $CO_2$ at concentrations intermediate between those involved with post-combustion $CO_2$ capture and syngas processes. These processes are listed in Table 1 and include biogas/landfill gas $CH_4$ upgrading, refineries, cement production and steel manufacturing. The $CO_2$ concentrations in these applications span a typical range of 20-40%. While different $CO_2$ removal technologies have been proposed for some of these processes, only biogas upgrading has seen significant deployment. The advantages of BAC solvent for biogas upgrading will be applicable to other applications listed in Table 1 since these processes all involve $CO_2$ removal under similar concentrations, however the current discussion will focus on biogas upgrading since this is the most widely employed commercial need.

Figure 12:
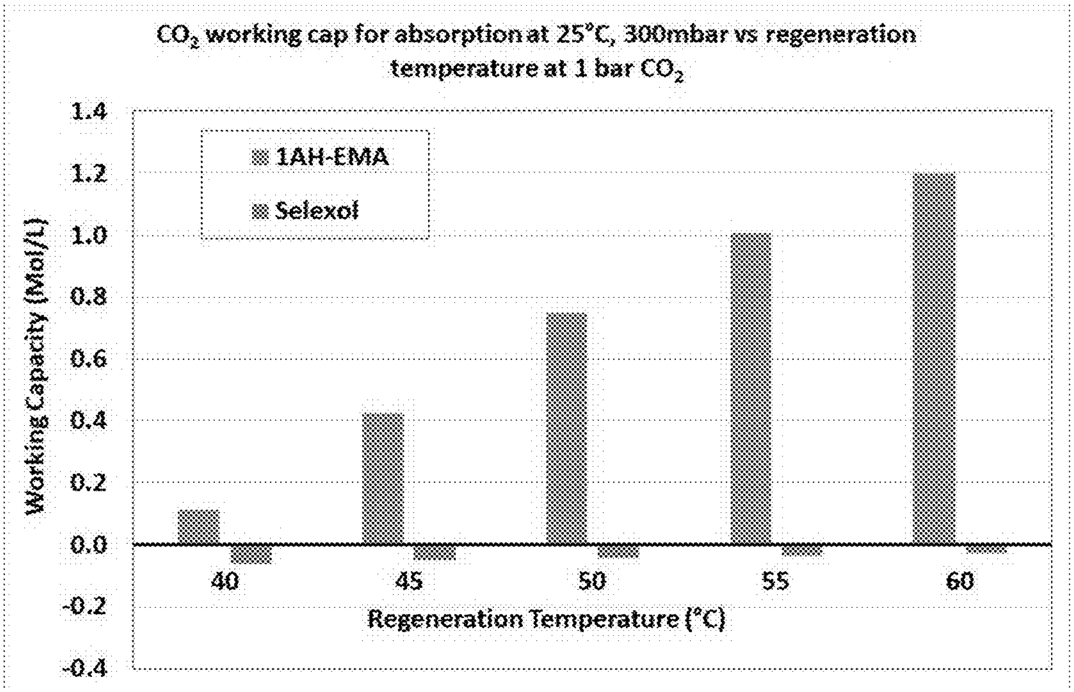
FIG. 12. Comparison of the theoretical working capacities of BAC solvent 1AH-EMA and commercial physical solvent Selexol for $CO_2$ removal from a gas stream containing 0.3 bar $P_{CO2}$ at a total system pressure of 1 bar as a function of solvent regeneration temperature with regeneration done in 1 bar $CO_2$. alternative strategies providing similar $CO_2$ working capacities where either solvent chilling is removed, or decompression of gas in the recovery step is reduced or removed. Either alternative could lead to savings in capital costs and operation.

Current commercial biogas upgrading processes that involve continually looping solvent systems predominantly use water or Selexol as $CO_2$ physical solvents. Both water and Selexol have relatively low $CO_2$ solubility and thus require compression of the biogas stream to increase $CO_2$ uptake in the solvent. Compression of the feed gas increases the energy demand of the system and increases co-adsorption of $CH_4$ in the solvent. Replacing Selexol with BAC solvent 1AH-EMA will allow the system to operate at ambient pressure while providing a significant enhancement in $CO_2$ working capacity and reduction in $CH_4$ co-adsorption. The results shown in FIG. 12 highlight the exceptional increase in $CO_2$ working capacity achieved when 1AH-EMA is used in place of Selexol in a biogas upgrading process operating without additional compression of the biogas. Selexol is completely ineffective under these conditions since the $CO_2$ solubility at the regeneration condition ($P_{CO2}$ 1 bar, 60° C.) is slightly higher than the $CO_2$ solubility at the capture condition ($P_{CO2}$ 300 mbar, 25° C.).

The working capacity of Selexol is essentially 0 wt % when the feed gas is not compressed above ambient pressure. As a consequence, biogas upgrading systems that employ Selexol operate the absorber at elevated pressures in the range of 6-8 bar and regenerate the solvent at 40° C. at 1 bar. The working capacity for Selexol under these conditions can be estimated based on the $CO_2$ Henry's constants for Selexol of 0.166 mol/(L*bar) at 20° C. and 0.107 mol/(L*bar) at 40° C. The theoretical maximum $CO_2$ working capacity in a 30% $CO_2$ stream at 8bar total pressure would be 2.4 bar×0.166 mol/(L*bar)−1 bar×0.107 mol/(L*bar)=0.291 mol/L. In contrast, the theoretical $CO_2$ working capacity for BAC solvent 1AH-EMA operating without compression of the feed gas with an absorber temperature of 25° C. and a solvent regeneration temperature of 45° C. is 0.42 mol/L. This is a 45% increase in working capacity using the same 20° C. temperature swing while removing the need for compression of the feed gas. The working capacity of 1AH-EMA can be improved significantly with a modest increase in the regeneration temperature. For example, increasing the absorption/desorption temperature swing from 20° C. to 30° C. more than doubles the working capacity from 0.42 mol/L to 1.01 mol/L. In contrast, increasing the desorption temperature for Selexol by 10° C. only shows a meager gain in working capacity from 0.29 mol/L to 0.31 mol/L. By simply increasing the temperature swing from 20° C. to 30° C., the working capacity of 1AH-EMA can be increased to 325% that of Selexol. This result is even more impressive because it does not require any compression of the feed gas.

Replacing Selexol in a biogas upgrading process with BAC solvent 1AH-EMA could theoretically increase $CO_2$ working capacity by 300% or more while removing the need for biogas compression. Operating the system at 1 bar will also provide an addition benefit of significant reduction in co-adsorbed $CH_4$ in the $CO_2$ removal solvent. The absorption of $CH_4$ in a solvent at conditions typical for biogas upgrading follows a linear correlation with pressure according to Henry's law, i.e., $CH_4$ solubility=Pressure×(Henry's Constant for $CH_4$). As such, the $CH_4$ solubility in the $CO_2$ removal solvent at 1 bar will be ⅙ the value at 6 bar or ⅛ the value at 8 bar. By operating the BAC biogas upgrading at 1 bar, the co-adsorption of $CH_4$ will be reduced by nearly 85% from a Selexol system operating at 6 bar assuming similar $CH_4$ henry's constants for the two solvents. In-house gravimetric measurements gave $CH_4$ solubility in Selexol of 0.0086 mol/(L*bar) at 20° C. and $CH_4$ solubility in 1AH-EMA of 0.016 mol/(L*bar) at 25° C. Based on these respective values, the $CH_4$ solubility from a 30/70 mixed $CO_2/CH_4$ feed gas at a total pressure of 6 bar would be 0.036 mol/L in Selexol. The same gas stream at 1 bar total pressure would give a $CH_4$ solubility in 1AH-EMA of 0.0112 mol/L. This equates to a 69% reduction in $CH_4$ losses due to solvent absorption. The low $CH_4$ uptake in 1AH-EMA will also lead to a significant enhancement in the purity of the recovered $CO_2$. The ratio of absorbed $CO_2$ to absorbed $CH_4$ in 1AH-EMA at 25° C. for a gas stream consisting of 30% $CO_2$ in $CH_4$ at 1bar is approximately 1.6/0.0112=143:1. Assuming complete release of co-adsorbed $CH_4$ and 1 mol/L of $CO_2$ during the regeneration will result in a recovered $CO_2$ stream consisting of only 88% $CO_2$/12% $CH_4$ for the Selexol process versus 99% $CO_2$/1% $CH_4$ for the 1AH-EMA process.

Figure 13:
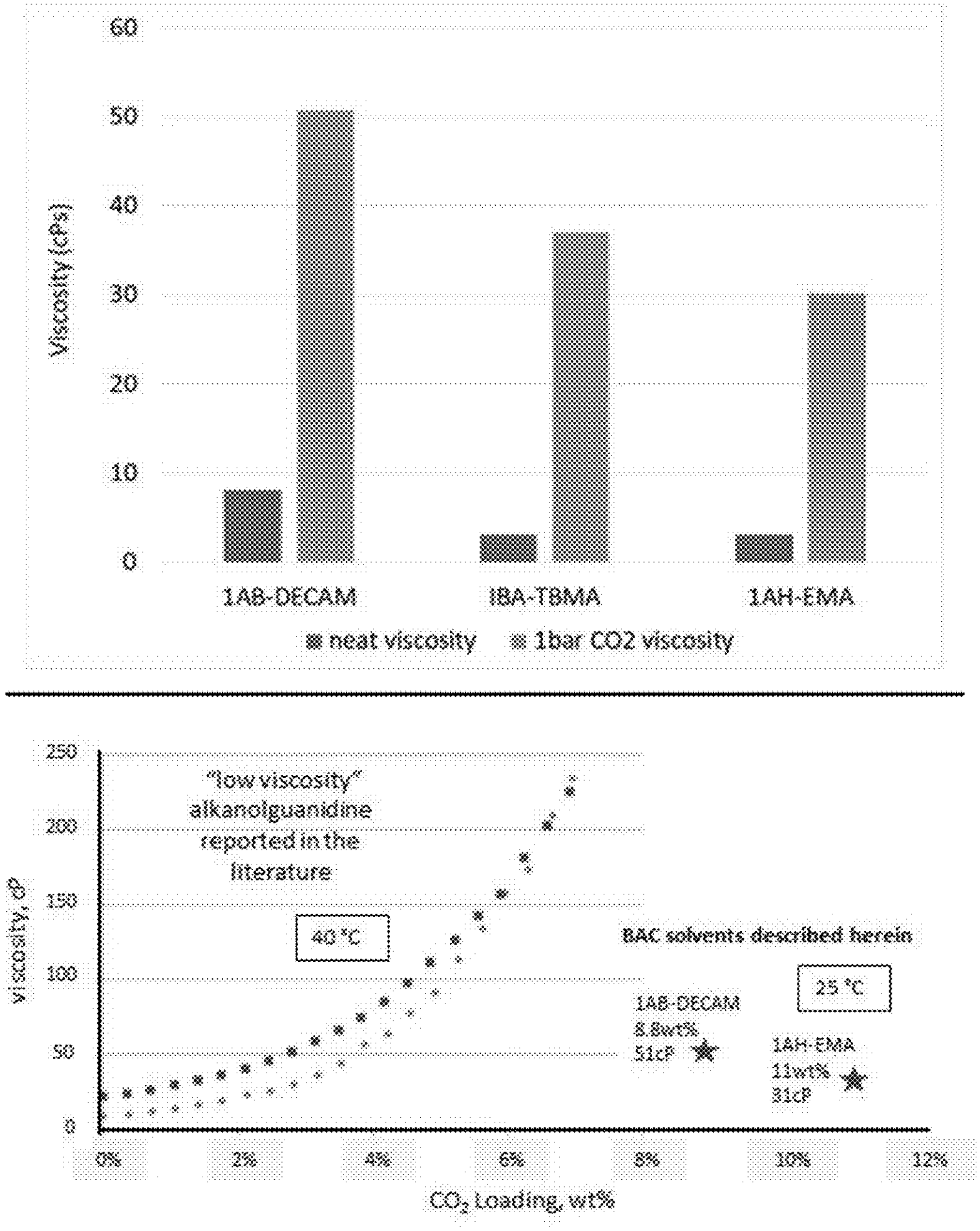
FIG. 13. (top) Viscosity changes in BAC solvents between $CO_2$ lean and $CO_2$ loaded phases after saturation at 1 bar. Note that projected uses of the solvents are targeted for $P_{CO2}$ 0.2-0.4 bar which will provide even lower $CO_2$ loaded viscosities. (bottom) BAC solvent viscosities (green stars) plotted to scale with viscosities reported by Koech et al. for an alkanolguanidine $CO_2$ capture solvent (diamonds for dry solvent and red squares for solvent with 10 wt % added water). The alkanolguanidine solvent is described in the report as a "low viscosity" solvent. The $CO_2$-loaded viscosities for BAC solvents reported herein are significantly lower than those of reported low viscosity solvents despite a cooler temperature and higher $CO_2$ loadings.[25]

The use of a non-aqueous BAC solvent such as 1AB-DECAM, 1AA-IBMA or 1AH-EMA in a $CO_2$ removal application in processes such as biogas upgrading, landfill gas upgrading, and cement production where $CO_2$ concentration in the feed gas is above 15% and operating near ambient conditions provides advantages over traditional aqueous amine solvents. These advantages include reduced corrosion rates and milder solvent regeneration conditions. BAC solvent such as 1AB-DECAM or 1AH-EMA can be regenerated at 1 bar under pure $CO_2$ streams at mild temperatures of 45-60° C., whereas aqueous amine solvents typically require steam stripping at temperatures in the range of 80-160° C. The cooler desorption temperature and pure $CO_2$ stripping sweep gas will result in significantly reduced solvent loss and reduced solvent decomposition while yielding a cleaner $CO_2$ recovery without co-adsorbed water. The perceived benefits of water lean amine solvents have led to an increasing interest recently among research groups to develop new and improved $CO_2$ capture solvents based on this strategy. The vast majority of these research efforts are aimed at applications involving post-combustion $CO_2$ capture, but some of their results are indeed relevant to related applications targeted for BAC solvents such as biogas upgrading, landfill gas upgrading, and cement production. The majority of prior attempts at water lean amine solvents for $CO_2$ capture have been hampered by significant increases in solvent viscosity in the $CO_2$ loaded phase. The increase in viscosity can be several orders of magnitude which leads to major penalties in $CO_2$ mass transfer rates and pumping costs. To evaluate the effect of $CO_2$ loading on viscosity, three BAC solvents were tested after saturation with $CO_2$ at 1 bar, 25° C. The results are shown in FIG. 13. All three solvents showed only a modest increase in viscosity in the $CO_2$ loaded phase compared to the neat phase, but much lower than typically reported for other water lean amine solvents. To put the $CO_2$-loaded BAC solvent viscosities in proper perspective, the results are compared against a recent literature report which touted the discovery of solvents with low $CO_2$-loaded viscosities. The reported solvents showed ten-fold viscosity increases up to values of ~250 cP at 40° C. after $CO_2$ absorption of 8 wt %. In contrast, BAC solvents show significantly lower $CO_2$-loaded viscosities even at higher $CO_2$ loadings and lower temperature. The 1AH-EMA solvent showed the smallest $CO_2$-loaded viscosity even though the solvent has the highest $CO_2$ uptake under the test conditions. At 25° C. with 11 wt % $CO_2$ absorbed; the solvent 1AH-EMA has a viscosity of only 30 cP. This $CO_2$ loaded viscosity is an order of magnitude below the value reported for the "low viscosity" solvent in the literature. It is important to note that the viscosity measurements were done on BAC solvents saturated with $CO_2$ at 1 bar due to equipment constraints. In the projected applications of these solvents, e.g., biogas upgrading, the partial pressure of $CO_2$ will be significantly below 1 bar and as such the $CO_2$ loading will be smaller as well. As such, the $CO_2$-loaded solvent viscosities under process conditions are projected to be 30-50% lower than those shown in FIG. 14 and well within the operational window of a solvent looping $CO_2$ removal system.

The defining chemical component of the BAC solvent molecular structures comprises the beta-amino carboxylate group shown below:

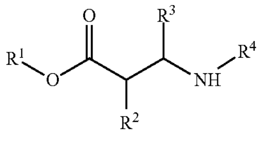

β-amino ester

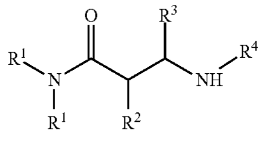

β-amino amide

Structures
$R^1$ alkyl
$R^2$ ($CH_3$, H)
$R^3$ ($CH_3$, H)
$R^4$ alkyl

The BAC carboxylate component may comprise either an ester or an amide. This core structural motif is critical for several reasons. The alkyl ester or dialkyl amide moiety controls the melting point and viscosity to ensure that the compound is liquid, stable, and has low volatility in the targeted temperature and pressure range of the application. Location of the amine site in a position beta to the carboxylate carbonyl carbon provides a unique electronic effect on amine reactivity and also provides a convenient route to synthesis using established high yield organic reactions, e.g., Michael addition, involving simple organic amines wherein the steric crowding of the amine site can be conveniently controlled. The physical properties and $CO_2$ affinity of the solvent can be easily optimized for a particular application via the incorporation of different alkyl groups on the amide, ester, and/or amine site. The optimal size of the alkyl groups is from C1-C6 to maintain high volumetric $CO_2$ uptake, low viscosity, and low melting point. To further illustrate the spirit of the invention, examples of BAC solvents which have been prepared and characterized are included in the appendix. The amine site functions best as a secondary amine. Two alkyl groups on the amide nitrogen are preferred to provide a melting point below room temperature.

The solvents are designed with the intention of using them as the primary $CO_2$ capture component in a $CO_2$ capture system. The total $CO_2$ capacity of the solvent will be maximized when operated as a neat solvent. However, in certain applications, the rate of $CO_2$ diffusion may be more critical than the overall $CO_2$ capacity of the solvent. In these circumstances, it may be advantageous to blend the BAC solvent with one or more co-solvents. These co-solvents would have a lower neat viscosity than the $CO_2$ loaded phase of the BAC solvent. The blend would then be optimized to provide the highest $CO_2$ diffusion rate and highest $CO_2$ absorption amount wherein one or more BAC solvents in the blend would be the main $CO_2$ reactive component.

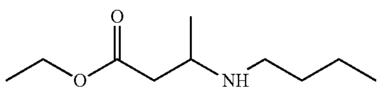

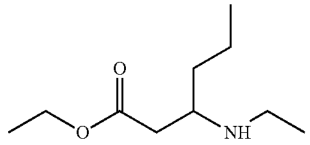

-continued

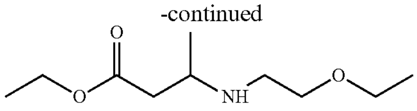

Examples of alternative versions of BAC solvents are shown above. Two derivatives of BAC solvents with similar molecular weights and steric hinderance around the amine sites. The structure on the left is prepared as described in this disclosure using a common crotonyl derivative and butyl amine, whereas the structure on the right is prepared from a specialty chemical and ethyl amine. An alternative BAC solvent (bottom) using an ether functionalized amine in place of an alkyl amine.

The structures of the BAC solvents can be designed to minimize water affinity. In certain applications where water absorption needs to be optimized, or in applications where water vapor absorption is of little concern, functionalization of the pendant alkyl groups may be preferred. As an example, the n-butyl group on the amine site could be replaced with an ether or ester group to provide an enhanced $CO_2$ affinity of the solvent. The BAC core structure can be derived from functionalization of an acrylate, methacrylate, or crotonate core since each of these building blocks are commodity chemicals and readily available at reasonable costs. One skilled in the art could use a specialty chemical in which the methyl group of the methacrylate or crotonate is replaced with an ethyl, propyl, butyl, pentyl or hexyl group in order to prepare a modified BAC solvent with similar molecular weight and steric influence on the amine site.

What is claimed:

1. A method of separating or removing $CO_2$ from a $CO_2$-containing fluid, comprising:

providing a beta-amino carboxylate composition comprising at least 5 wt % of a beta-amino carboxylate or mixture of beta-amino carboxylates;

combining the $CO_2$-containing fluid and the beta-amino carboxylate or mixture of beta-amino carboxylates at a first temperature and pressure to form a reaction product of $CO_2$ and the beta-amino carboxylate or mixture of beta-amino carboxylates; and exposing the reaction product of $CO_2$ and the beta-amino carboxylate or mixture of beta-amino carboxylates to a second temperature and pressure to release the $CO_2$ from the reaction product.

2. A method of separating or removing $CO_2$ from a $CO_2$-containing fluid, comprising:

providing a beta-amino carboxylate composition comprising a beta-amino carboxylate or mixture of beta-amino carboxylates;

combining the $CO_2$-containing fluid and the beta-amino carboxylate or mixture of beta-amino carboxylates at a first temperature and pressure to form a reaction product of $CO_2$ and the beta-amino carboxylate or mixture of beta-amino carboxylates; wherein the $CO_2$-containing fluid comprises at least 10 mol % $H_2O$; wherein the beta-amino carboxylate composition absorbs a higher percentage of the $CO_2$ than $H_2O$ from the $CO_2$-containing fluid; and exposing the reaction product of $CO_2$ and the beta-amino carboxylate or mixture of beta-amino carboxylates to a second temperature and pressure to release the $CO_2$ from the reaction product.

3. The method of claim 1 wherein the $CO_2$-containing fluid is a $CO_2$-containing fluid mixture comprising $CO_2$ and at least one other gaseous species, and wherein the step of separating or removing $CO_2$ comprises separating $CO_2$ from the at least one other gaseous species in the $CO_2$-containing fluid mixture.

4. The method of claim 3 comprising pressure swing adsorption wherein the second pressure is less than the first pressure.

5. The method of claim 3 comprising temperature swing adsorption wherein the second temperature is greater than the first temperature.

6. The method of claim 1 further comprising a step of storing the released $CO_2$ in an underground cavern.

7. The method of claim 1 wherein the beta-amino carboxylate is selected from the group consisting of:

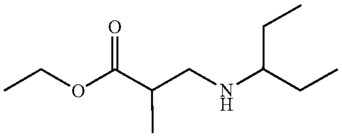

3AP-EMA

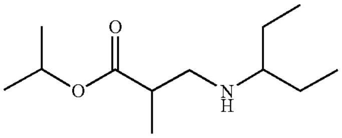

3AP-IPMA

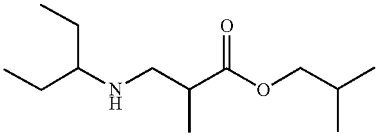

3AP-IBMA

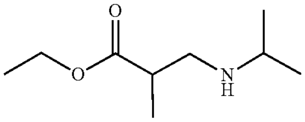

IPA-EMA

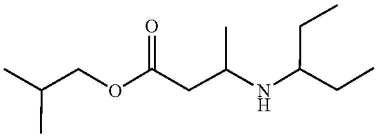

3AP-IBC

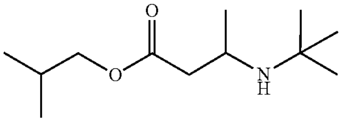

TBA-IBC

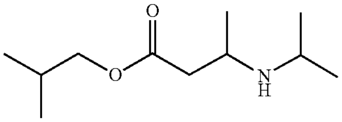

IPA-IBC

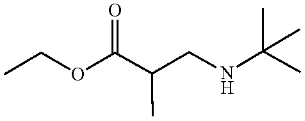

TBA-EMA

-continued

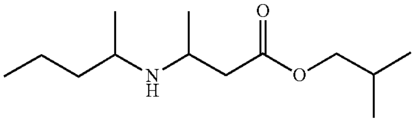

2AP-IBC

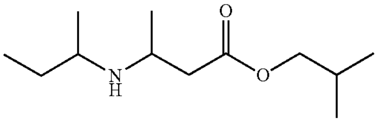

2AB-IBC

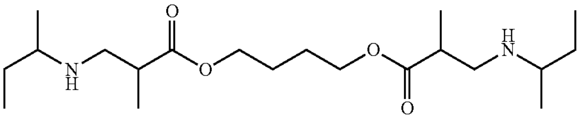

2AB-BDMA-2AB

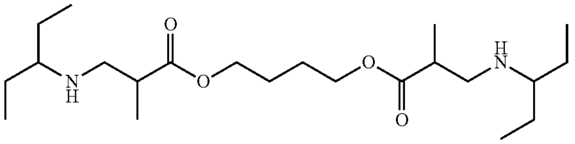

3AP-BDMA-3AP

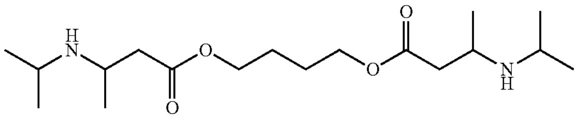

IPA-BDC-IPA

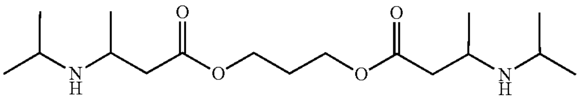

IPA-PDC-IPA

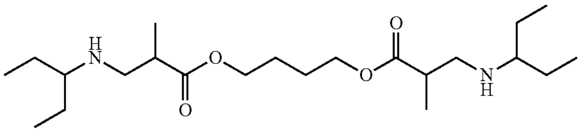

3AP-BDMA-3AP

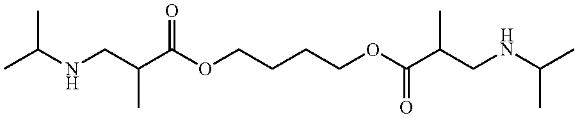

IPA-BDMA-IPA

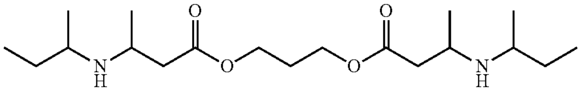

2AB-PDC-2AB

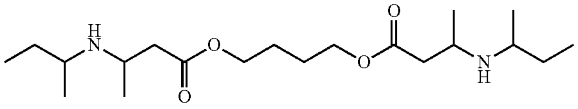

2AB-BDC-2AB

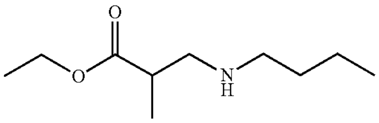

1AB-EMA

-continued
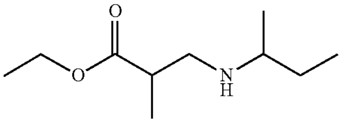
2AB-EMA
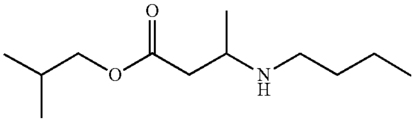
1AB-IBC
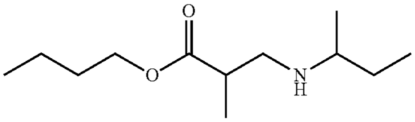
2AB-NBMA
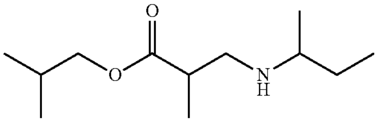
2AB-IBMA
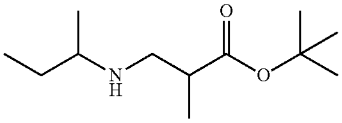
2AB-TBMA
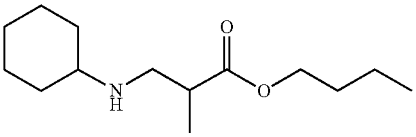
cy6A-NBMA
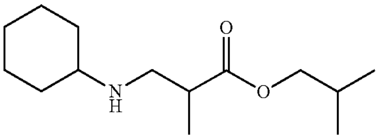
cy6A-IBMA
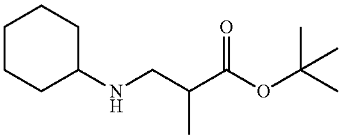
cy6A-TBMA
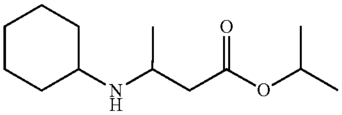
cy6A-IPC
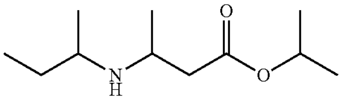
2AB-IPC
-continued
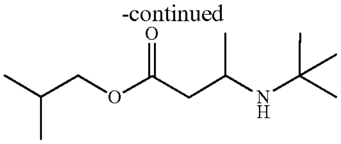
TBA-IBC
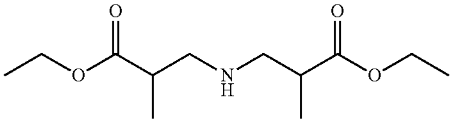
EMA-NH-EMA
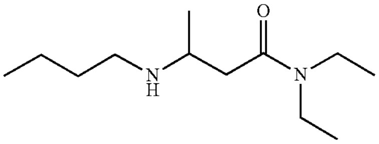
1AB-DECAM
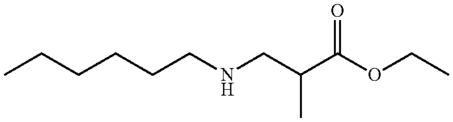
1HA-EMA
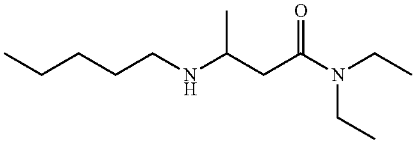
1AA-DECAM
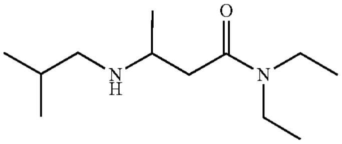
IBA-DECAM
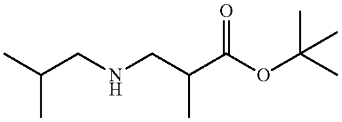
IBA-TBMA
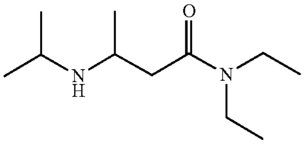
IPA-DECAM
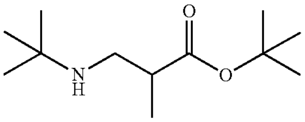
TBA-TBMA
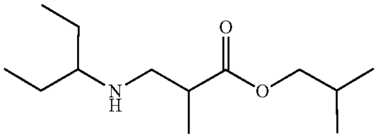
3AP-IBMA -continued

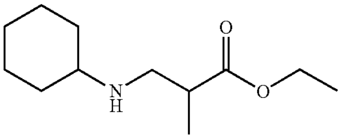

cy6A-EMA

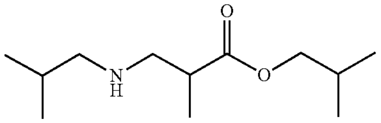

IBA-IBMA

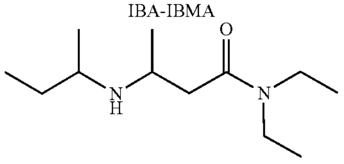

2AB-DECAM

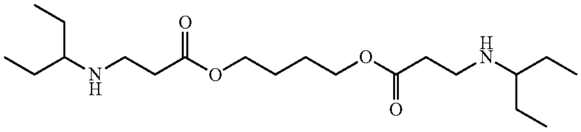

3AP-BDA-3AP

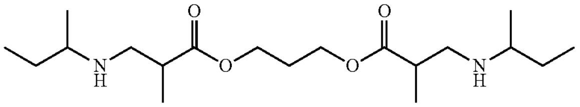

2AB-PDMA-2AB

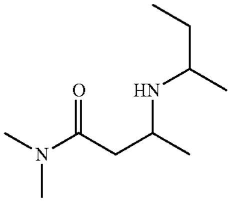

2AB-DMCAM

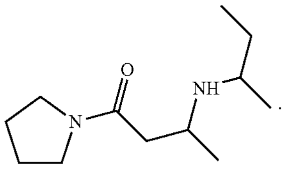

2AB-PYCAM

8. The method of claim 1 wherein the beta-amino carboxylate composition comprises less than 5% water by weight.

9. The method of claim 8 wherein the beta-amino carboxylate composition comprises less than 3% added water by volume.

10. The method of claim 1 wherein the beta-amino carboxylate composition comprises at least 50 wt % of a beta-amino carboxylate or mixture of beta-amino carboxylates.

11. The method of claim 1 wherein the beta-amino carboxylate composition comprises at least 10 wt % of a non-aqueous solvent.

12. The method of claim 1 comprising a plurality of cycles of temperature swing absorption.

13. The method of claim 1 wherein the $CO_2$ containing fluid comprises at least 1 mol % $CO_2$.

14. The method of claim 13 wherein the $CO_2$ containing fluid comprises at least 5 mol % $H_2O$, and a $CO_2/H_2O$ in a ratio of from 0.01 to 5, and wherein, in a single cycle, more $CO_2$ is adsorbed than $H_2O$.

15. The method of claim 13 wherein the $CO_2$ containing fluid comprises 10 mol % $H_2O$ or less, and a $CO_2/H_2O$ in a ratio greater than 0.5, and wherein, in a single cycle, at least twice as much $CO_2$ than $H_2O$ is adsorbed.

16. The method of claim 1 conducted in a temperature range of 0 to 50° C.

17. A beta-amino carboxylate composition comprising at least 5 wt % of one or more of the compounds listed in claim 7; and comprising at least 5 wt % $CO_2$ or at least 5 wt % of the reaction product of $CO_2$ and one or more of the compounds listed in claim 7.

18. A beta-amino carboxylate composition comprising at least 2 wt % of one or more of the compounds listed in claim 7; and comprising at least 1 wt % $CO_2$ or at least 2 wt % of the reaction product of $CO_2$ and one or more of the compounds listed in the Appendix or elsewhere in the specification; and further comprising at least 10 wt % (or at least 25 wt % or at least 50 wt %) of a non-aqueous solvent.

19. A beta-amino carboxylate composition comprising one or any combination of the compounds listed in claim 7; and comprising at least 5 wt % $CO_2$ or at least 5 wt % of the reaction product of $CO_2$ and one or any combination of the compounds listed in claim 7.

20. The composition of claim 18 wherein the beta-amino carboxylate composition comprises less than 5% or less than 3% or less than 1% water by weight.

21. The composition of claim 1 wherein the beta-amino carboxylate composition comprises at least 50 wt % or at least 75 wt % or at least 90 wt % of a beta-amino carboxylate or mixture of beta-amino carboxylates.

22. A $CO_2$ separation system comprising the composition of claim 19.

* * * * *